(12) United States Patent
Keishima et al.

(10) Patent No.: US 7,145,116 B2
(45) Date of Patent: Dec. 5, 2006

(54) INDUCTION HEATING COIL

(75) Inventors: Toshihiro Keishima, Kobe (JP); Akira Kataoka, Sanda (JP); Katsuyuki Aihara, Akashi (JP); Nobuyoshi Makio, Miki (JP); Kazuya Gotou, Kato-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/524,595

(22) PCT Filed: Aug. 13, 2003

(86) PCT No.: PCT/JP03/10328

§ 371 (c)(1),
(2), (4) Date: Feb. 15, 2005

(87) PCT Pub. No.: WO2004/017681

PCT Pub. Date: Feb. 26, 2004

(65) Prior Publication Data

US 2005/0284862 A1    Dec. 29, 2005

(30) Foreign Application Priority Data

Aug. 15, 2002    (JP)    ............... 2002-237222

(51) Int. Cl.
*H05B 6/36*    (2006.01)
*H01F 5/06*    (2006.01)
*H05B 6/12*    (2006.01)

(52) U.S. Cl. .................. 219/672; 219/676; 29/602.1; 336/205; 336/206

(58) Field of Classification Search ........ 219/672–677; 336/205–209, 199, 225; 29/602.1, 605
See application file for complete search history.

(56) References Cited

U.S. PATENT DOCUMENTS 3,662,461 A * 5/1972 Lake et al. .................... 29/605
4,106,709 A * 8/1978 Ortmanns et al. ....... 242/441.3

FOREIGN PATENT DOCUMENTS

| JP | 52-7017 | 1/1977 |
| JP | 59-82994 U | 6/1984 |
| JP | 60-24094 U | 2/1985 |
| JP | 5-298390 A | 11/1993 |

(Continued)

*Primary Examiner*—Philip H. Leung
(74) *Attorney, Agent, or Firm*—Akin Gump Strauss Hauer & Feld, LLP

(57) ABSTRACT

An induction heating coil having little high-frequency loss and producing little hast is easily manufactured by covering a conductor with a first insulating material to form a wire, then bundling and twisting such wires to form a stranded wire, covering the outer surface of the stranded wire with a second insulating material to form a coil wire, winding the coil wire a certain number of turns into a coil portion having a certain shape. The end portion of the coil portion and a connecting portion are heated with Joule heat while applying pressure to the end portion at the same time, so that the first and second insulating materials are fused and pressure-bonded to the conductor. Thus a terminal portion for the external connection of the coil portion is fixed while keeping the electrical connection with the conductor. Accordingly, an induction heating coil of low cost and stable quality can be easily manufactured. The induction heating coil producing little heat because of its high-frequency loss and suitable for induction heating of a highly-conductive nonmagnetic substance such as aluminum.

8 Claims, 30 Drawing Sheets

FOREIGN PATENT DOCUMENTS

| | | |
|---|---|---|
| JP | 6-260270 A | 9/1994 |
| JP | 10-50217 A | 2/1998 |
| JP | 10-92565 A | 4/1998 |
| JP | 10-321358 A | 12/1998 |
| JP | 2000-58251 A | 2/2000 |
| JP | 2001-210462 A | 8/2001 |
| JP | 2002-15852 A | 1/2002 |
| JP | 2002-075611 A | 3/2002 |
| JP | 2002-207376 A | 7/2002 |
| JP | 2003-115368 A | 4/2003 |
| JP | 2003-151754 A | 5/2003 |

* cited by examiner

F I G. 3
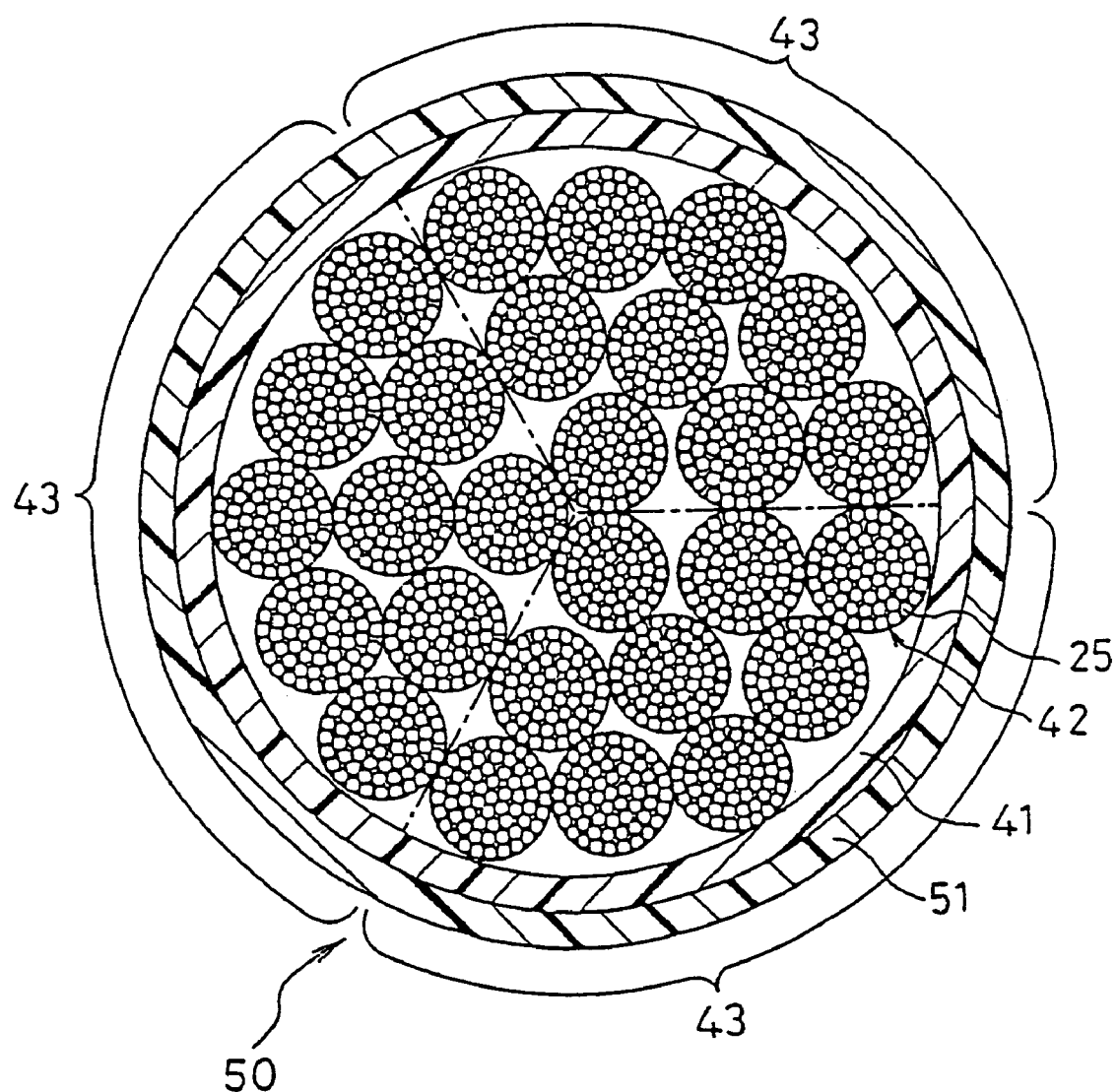

F I G. 8
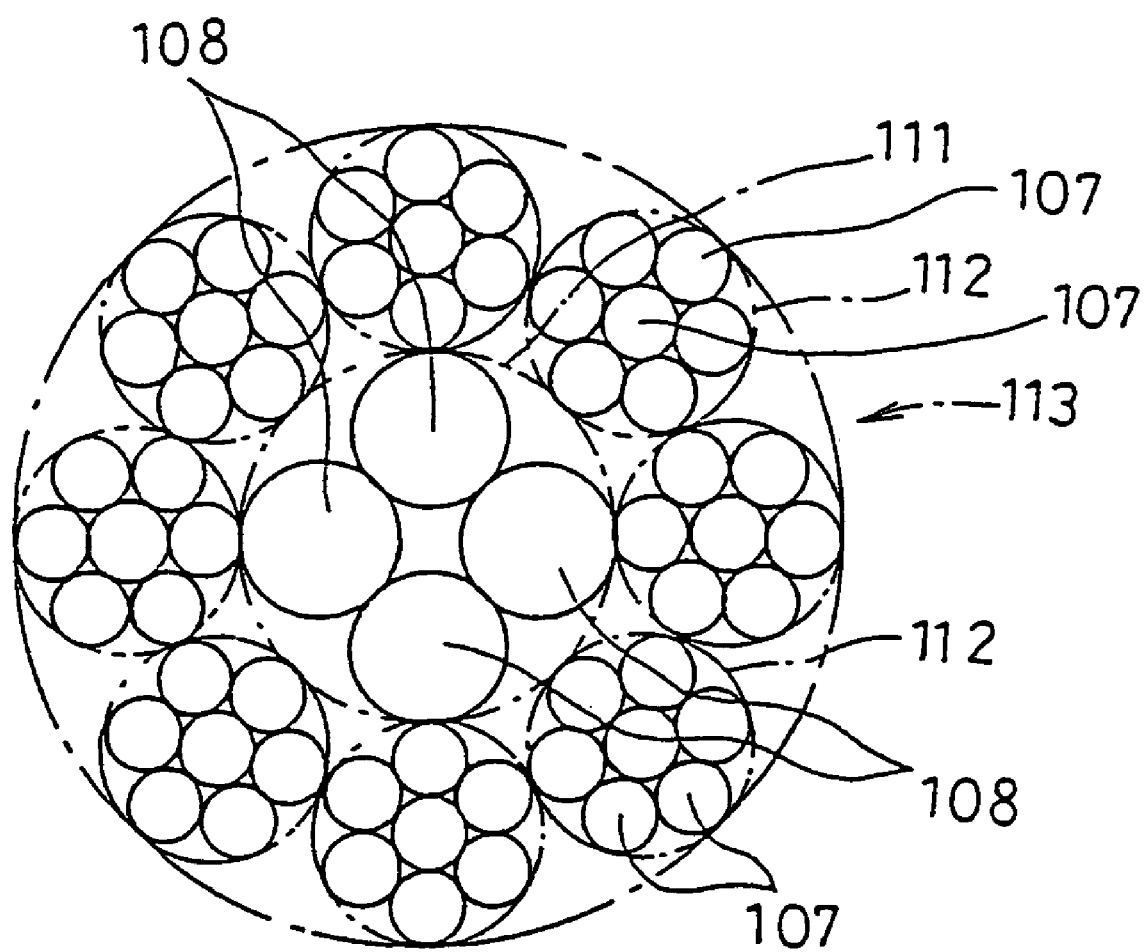

FIG. 13
(a)
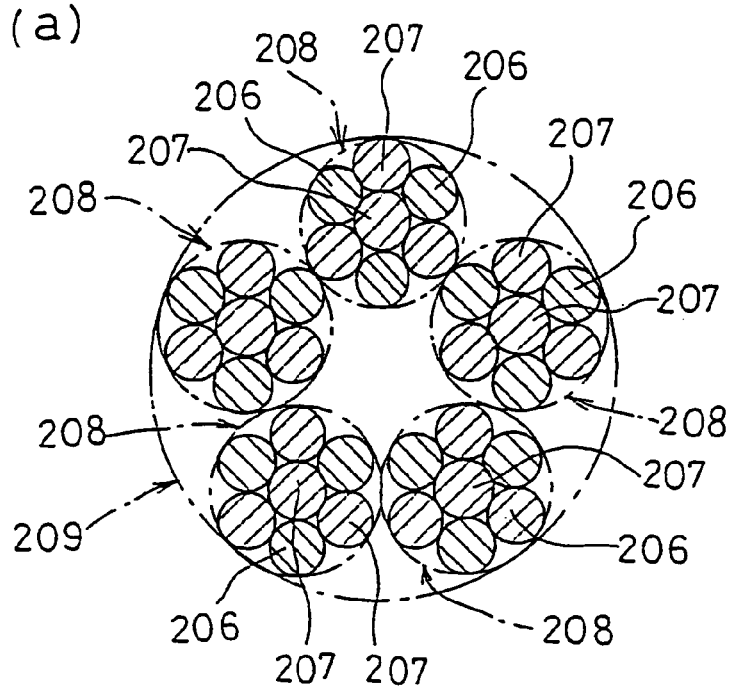
(b)
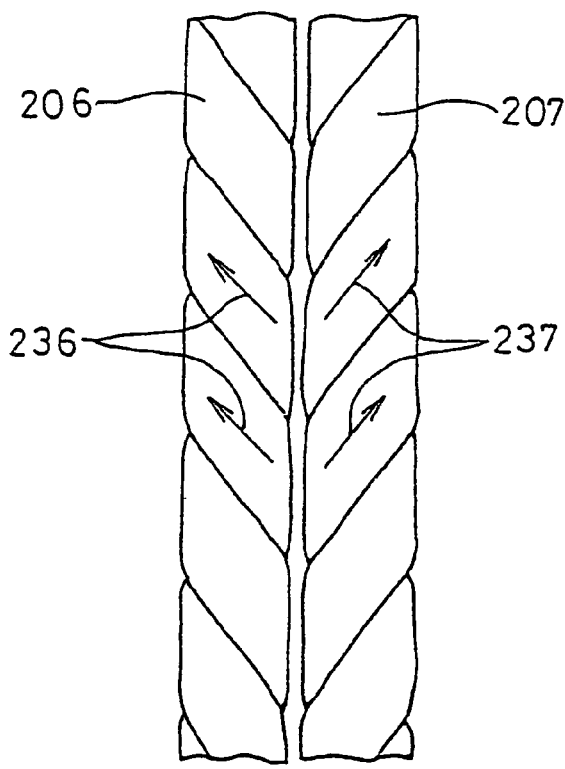

F I G. 1 5
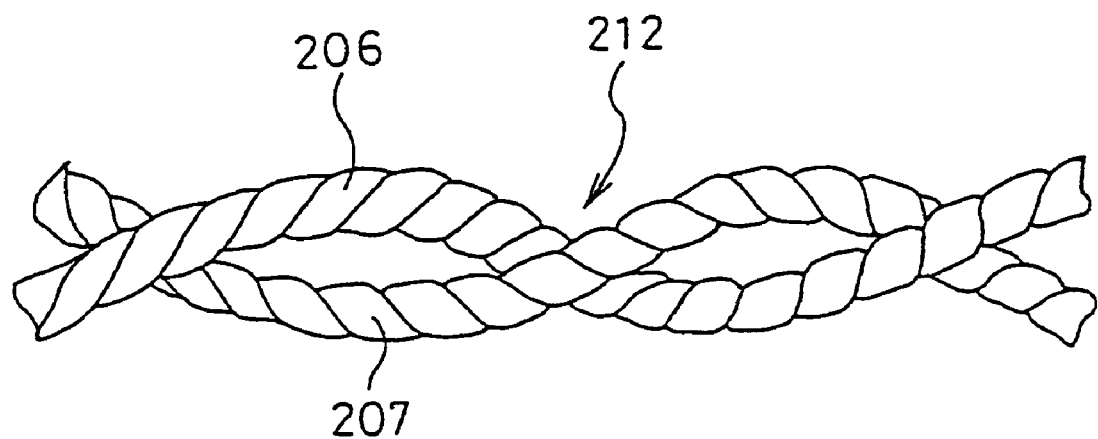

FIG. 17
(a)
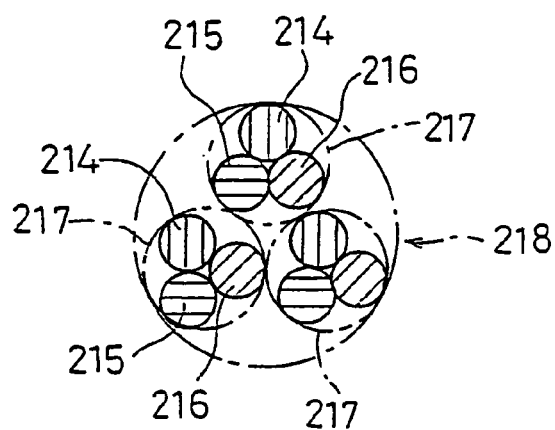
(b)
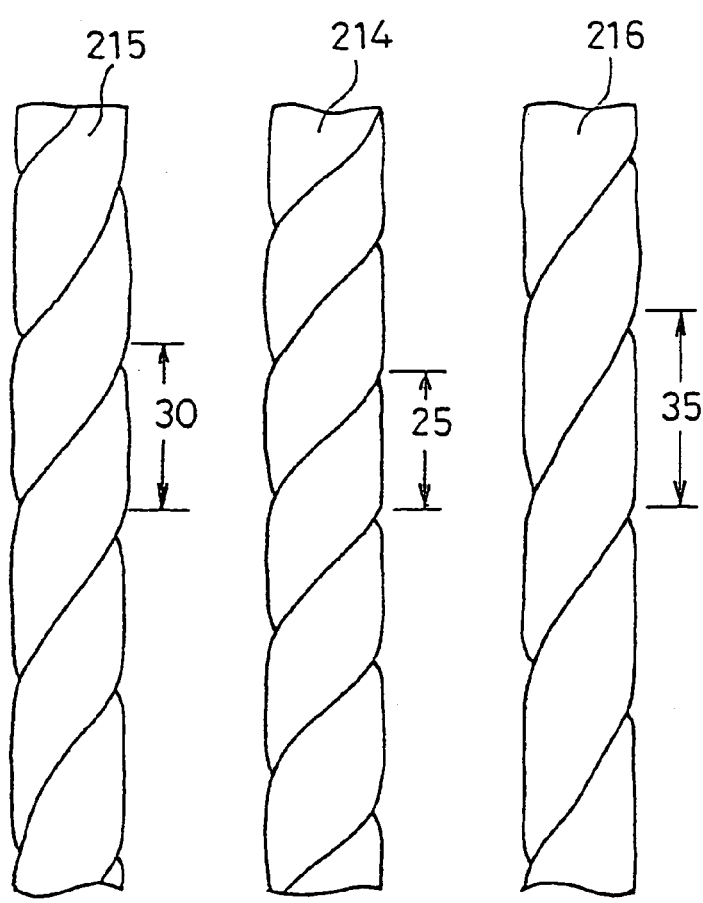

F I G. 2 0
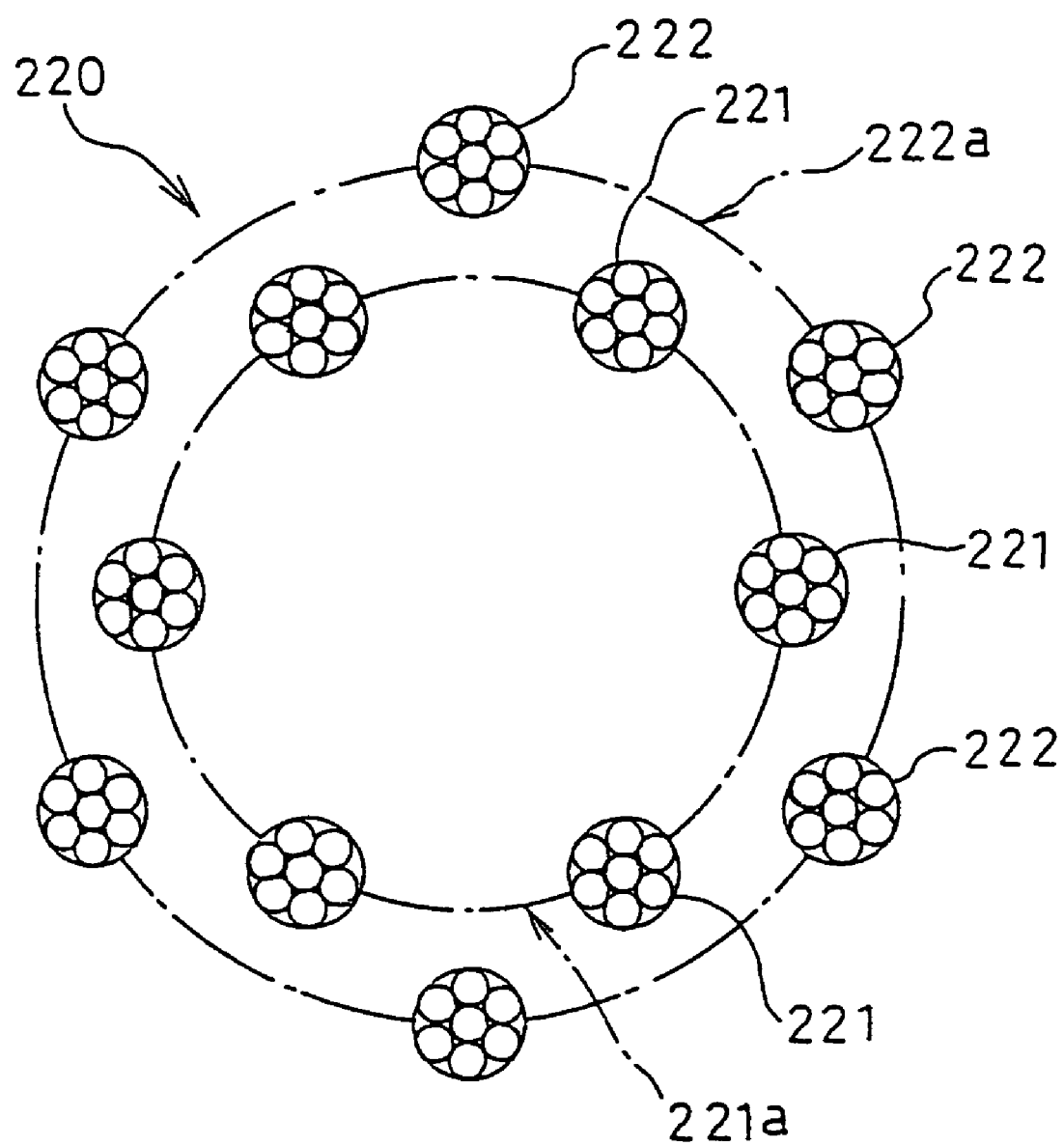

FIG. 24
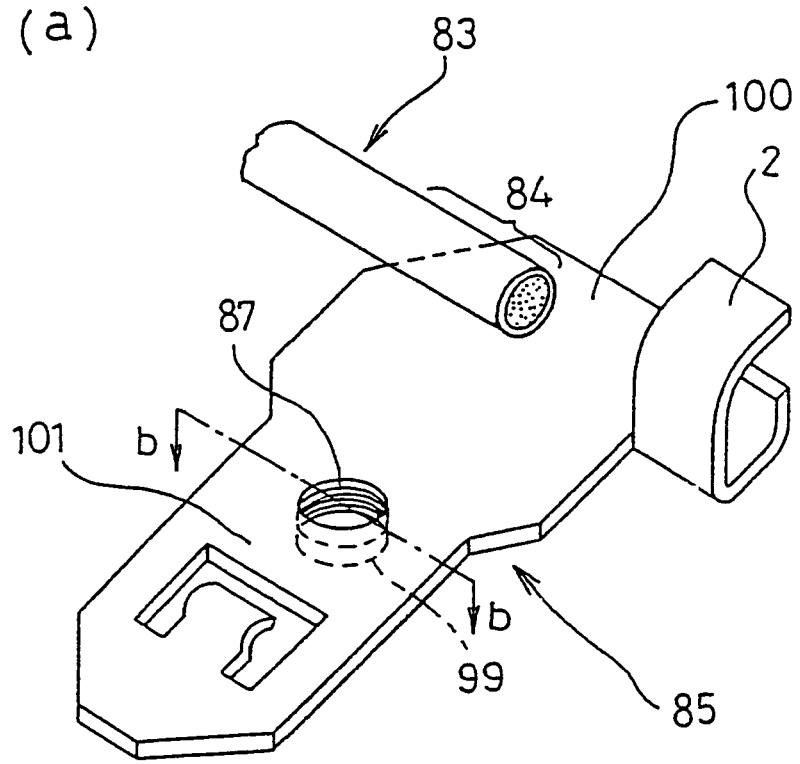
(a)
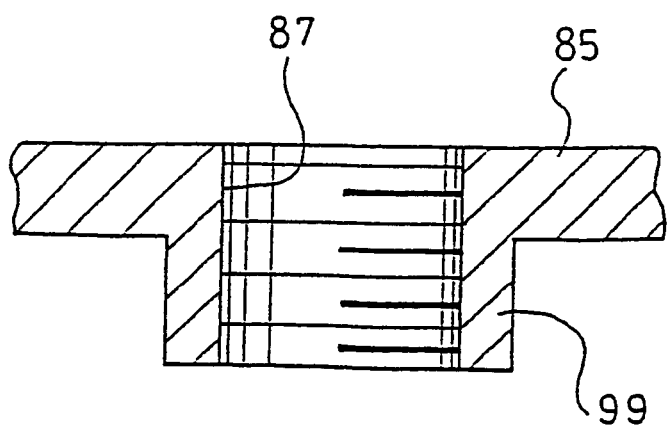
(b)

FIG. 28
(a)
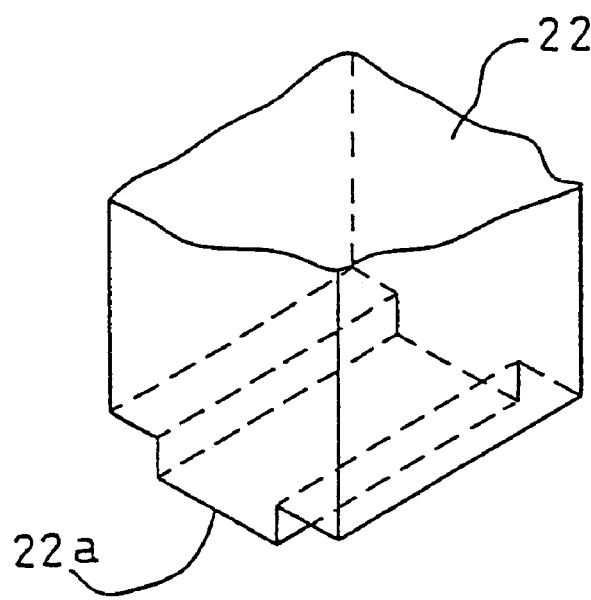
(b)
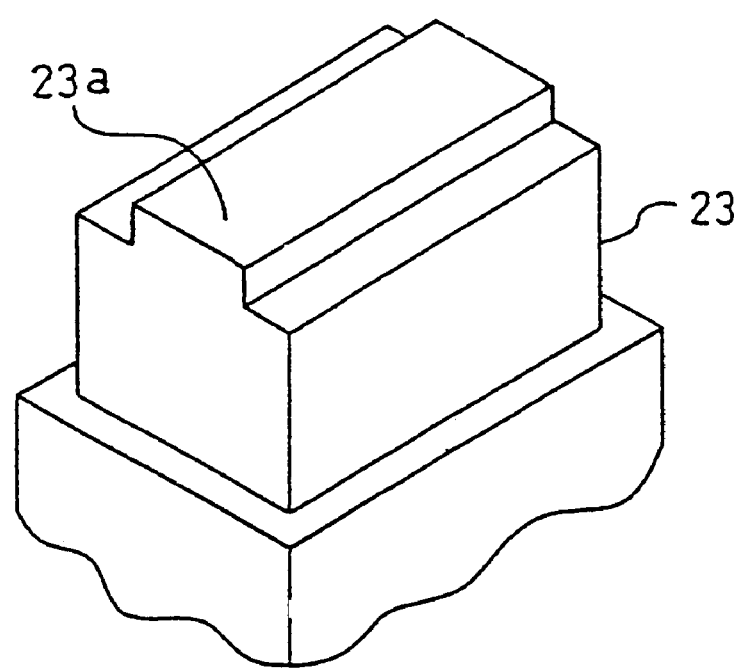

INDUCTION HEATING COIL

CROSS-REFERENCE TO RELATED APPLICATIONS

This application is a Section 371 of International Application No. PCT/JP2003/10328, filed Aug. 13, 2003, which was published in the Japanese language on Feb. 26, 2004, under International Publication No. WO 2004/017681 A1, and the disclosure of which is incorporated herein by reference.

BACKGROUND OF THE INVENTION

The present invention relates to an induction heating coil, provided in an induction heating apparatus, for heating an object to be heated having low resistance and low magnetic permeability, such as aluminum, in particular.

Iron pans having high magnetic permeability have been used conventionally as pans for use in induction heating cooking apparatuses; however, in recent years, there is an increasing demand for use of pans other than iron pans, such as copper and aluminum pans. In the case that a copper pan or an aluminum pan is induction heated, a high-frequency current having a frequency of approximately 40 to approximately 100 kHz, higher than a frequency of approximately 20 to approximately 30 kHz suited for an iron pan, is required to flow through the heating coil since copper and aluminum have low resistivity and low magnetic permeability. However, when the frequency becomes higher, the high-frequency current flows only near the surface of a conductor owing to the skin effect. In other words, the current does not flow in the central portion of the sectional area; this is the same that the sectional area of the conductor is small in effect, whereby the effective resistance of the heating coil wire itself increases significantly during operation. Hence, as a method for increasing the surface area and thereby effectively decreasing the resistance, a method has been used wherein several to several tens of wires, each wire being a thin conductor (for example, a copper wire of 0.1 mm in diameter) having an insulation covering on its surface, are bundled to produce a heating coil.

In addition, the coil wire serving as a conductor for the heating coil has a multi-stage collective structure wherein stranded wires obtained by bundling wires are further twisted to decrease the effective resistance (effective resistance) developed in effect owing to the skin effect. Furthermore, it is proposed that the stranded wire obtained at least in the first stage is formed by weaving to suppress the increase in the resistance owing to the proximity effect (hereinafter referred to as the proximity action), or the like. The proximity action is a phenomenon wherein when high-frequency currents flow in adjacent conductors, the currents are affected mutually via magnetic fields, and deflection occurs in current distribution, whereby the effective resistances on the surfaces of the conductors increase. The proximity action becomes more significant as the directions of the high-frequency currents are more uniform among the conductors and as the clearances among the conductors are smaller. In the above-mentioned conventional configurations, the resistance of the heating coil with respect to the high-frequency current can be decreased to some extent. However, for further improvement in the efficiency of induction heating, it is necessary to further decrease the resistance of the coil.

In the above-mentioned conventional configurations, the coil resistance (high-frequency resistance) of the heating coil with respect to the high-frequency current can be decreased. However, in the case that a heating coil for heating a pan made of copper or aluminum is produced by adopting these configurations, it is necessary that the conductor diameter of a wire is made as small as possible to 0.1 mm or less and that as many of such wires as possible (for example, 1000 to 2000 wires) are bundled to form a coil wire. When the wire diameter is small as described above, problems occur; for example, the insulator on the surface of the wire is damaged and the conductor is liable to break.

Furthermore, when a terminal for external connection (for connection to an inverter for supplying a high-frequency current to this heating coil) is attached to an end of the coil wire configured as described above, the insulation covering of each wire at the end portion of the coil wire, approximately 10 mm in length, is dipped in a predetermined chemical and eliminated so that its conductor (for example, a copper wire) is exposed. Then, the wires are cleaned and bundled again and then crimped and soldered to the terminal, whereby electrical connection is carried out among the respective conductors mutually and to the terminal.

Hence, a problem of making the work for connecting the terminals for external connection to the ends of the coil wire very complicated is caused.

BRIEF SUMMARY OF THE INVENTION

An object of the present invention is to provide a low-priced induction heating coil having high-frequency power loss being low enough to suppress the heat generation thereof and having an improved effect of suppressing dielectric breakdown of the insulating materials covering the conductive portions thereof even when a large high-frequency current capable of sufficiently induction heating a pan made of a material having low resistance and low magnetic permeability, such as aluminum, is passed through.

Another object of the present invention is to provide an induction heating coil having low self-heating and having excellent heating efficiency by decreasing the influences of the skin effect and the proximity action and by reducing the resistance of the heating coil with respect to a high-frequency current.

An induction heating coil in accordance with the present invention has a coil portion wherein stranded wires each obtained by bundling and twisting multiple wires whose conductors are covered with a first insulating material are covered on the outer faces thereof with a second insulating material formed of a fluorocarbon resin having insulation layers having different melting points, the melting point of the fluorocarbon resin for use in the outermost insulation layer of the second insulating material being made lower than the melting point of PFA serving as the fluorocarbon resin for use in the inner insulation layer thereof, to form a coil wire serving as a coil conductive wire, and the coil wire is wound a predetermined number of turns so as to have a predetermined shape.

With this configuration, multiple wires whose conductors are covered with the first insulating material are bundled and twisted to form each stranded wire. The diameter of the wire is made very small (for example, 0.05 mm), and the insulation thickness of each wire is made thin (for example, 100 µm). Hence, even if the number of the wires is increased (approximately 1600), the diameter of the stranded wires can be made small (for example, approximately 3.5 mm).

In addition, the outer faces of the stranded wires are covered with the second insulating material to form the coil wire, whereby when the coil portion is formed into a predetermined shape by winding the coil wire a predetermined number of turns, the second insulating material serves as a protection film. Hence, partial undoing of twisting or breakage owing to nonuniform forces applied to the wires does not occur during winding operation. Furthermore, the first insulating material is scratch resistant, whereby quality is made stable and coil wire winding work is facilitated simultaneously.

Moreover, it is characterized in that the second insulating material covering the outer faces of the stranded wires is a fluorocarbon resin. Since the fluorocarbon resin has a high heat-resistant temperature and is high in flexibility, insulation is improved, and coil wire winding work is facilitated.

Additionally, it is characterized in that the second insulating material has multiple fluorocarbon resin layers having different melting points, and the melting point of the fluorocarbon resin for use in the outermost insulation layer is made lower than the melting point of PFA serving as the fluorocarbon resin for use in the inner insulation layer thereof. After the coil wire is wound to form a coil portion, the coil portion is heated so that the temperature of the outermost layer becomes higher than the melting point of the outermost layer and so that the temperature of the inner insulation layer thereof becomes lower than the melting point of the insulation layer. After at least the outermost insulation layer is fused by the heating, cooling is carried out. Hence, while the wires are protected with the inner insulation layer not fused or slightly fused even if fused to some extent, the adjacent coil wire are bonded mutually, whereby the shape of the coil portion can be fixed. Therefore, the work for forming the coil portion is facilitated, and the reliability can be raised.

Furthermore, the induction heating coil has the terminal portions for external connection secured to the coil wire while electrical connection to the conductors of the coil wire is maintained, by heating and fusing the first insulating material and the second insulating material at the ends of the coil portion using Joule heat generated by current application and by pressurizing them at the same time. The second insulating material covering the surfaces of the stranded wires and the first insulating material on the surfaces of the respective conductors of the wires are partly fused by the heat generation at the terminal portions and move around the circumference of the pressure-bonded portion. Hence, the electrical connection among the conductors of the wires and between the conductors of the wires and the terminal portions for external connection can be carried out by pressure-bonding securely in a short time.

An induction heating coil in accordance with the present invention has a configuration wherein a coil wire formed of stranded wires obtained by twisting wires having different sectional areas is wound. With this configuration, a wire having a large sectional area is disposed between wires having a small sectional area. Hence, space between a wire having the small sectional area and another wire having the small sectional area can be widened, and the increase in high-frequency resistance owing to the proximity action can be reduced.

An induction heating coil in accordance with the present invention has a configuration wherein a right stranded wire obtained by twisting a bundle of multiple wires clockwise and a left stranded wire obtained by twisting a bundle of multiple wires counterclockwise are mixed to form a coil wire. With this configuration, the influence of the proximity action that occurs in the case that numerous thin wires are used to reduce the influence of the skin effect can be reduced. In other words, in the induction heating coil in accordance with the present invention, the coil wire having the above-mentioned configuration is wound, whereby the radius of a wire being bent on the inner side and the radius of a wire being bent on the outer side are different, whereby the directions of currents become nonuniform. Furthermore, since the directions of currents in the right stranded wire and the left stranded wire become nonuniform, the proximity action can be reduced.

Briefly stated, the present invention is directed to an induction heating coil having a coil portion wherein stranded wires each obtained by bundling and twisting multiple wires whose conductors are covered with a first insulating material are covered on the outer faces thereof with a second insulating material formed of a fluorocarbon resin having insulation layers having different melting points, the melting point of the fluorocarbon resin for use in the outermost insulation layer of the second insulating material being made lower than the melting point of PFA serving as the fluorocarbon resin for use in the inner insulation layer, to form a coil wire serving as a coil conductive wire, and the coil wire is wound a predetermined number of turns so as to have a predetermined shape.

When multiple wires whose conductors are covered with the first insulating material are bundled and twisted to form each stranded wire, the diameter of the wire is made very small (for example, 0.05 mm), and the insulation thickness of each wire is made thin (for example, 100 µm). Hence, even if the number of the wires is increased (approximately 1600), the diameter of the stranded wires can be made small (for example, approximately 3.5 mm).

The outer faces of the stranded wires are covered with the second insulating material to form the coil wire, whereby when the coil portion is formed into a predetermined shape by winding the coil wire a predetermined number of turns, the second insulating material serves as a protection film. Hence, partial undoing of twisting or breakage owing to nonuniform forces applied to the wires does not occur during winding operation, and the first insulating material is scratch resistant. As a result, the quality of the induction heating coil is made stable and coil wire winding work is facilitated simultaneously.

Moreover, the second insulating material covering the outer faces of the stranded wires is a fluorocarbon resin. Since the fluorocarbon resin is high in heat-resistant temperature and highly flexible, insulation is improved, and coil wire winding work is facilitated. In the terminal processing in accordance with the present invention, each terminal portion is held, fused and pressurized at the connection portion while the terminal portion of the coil wire is covered with the fluorocarbon resin. Hence, the electrical connection between the conductors and terminal portions can be carried out stably. The production of an induction heating coil suited for induction heating aluminum or the like, including the terminal processing, is further facilitated.

Additionally, the second insulating material has multiple fluorocarbon resin layers having different melting points, and the melting point of the fluorocarbon resin for use in the outermost insulation layer is made lower than the melting point of PFA serving as the fluorocarbon resin for use in the inner insulation layer thereof. After the coil wire is wound to form a coil portion, the coil portion is heated so that the temperature of the outermost layer becomes higher than the melting point of the outermost layer and so that the temperature of the inner insulation layer thereof becomes lower than the melting point of the insulation layer. After at least the outermost insulation layer is fused by the heating, cooling is carried out. Hence, while the wires are protected with the inner insulation layer not fused or slightly fused even if fused to some extent, the adjacent portions of the coil wire are bonded mutually, whereby the shape of the coil portion can be fixed. Therefore, the work for forming the coil portion is facilitated, and the reliability can be raised.

In another aspect, the present invention is directed to an induction heating coil production method which comprises a step of forming a coil portion by winding a coil wire a predetermined number of turns so as to have a predetermined shape, the coil wire being formed by covering the outerfaces of stranded wires, each obtained by bundling and twisting multiple wires whose conductors of 0.1 mm or less in diameter are covered with a first insulating material, with a second insulating material, and a step of connecting terminals for external connection to the ends of the coil portion while electrical connection to the conductors is maintained by carrying out heat generation using Joule heat generated by current flowing at the connection portions of the terminals for external connection and by pressurizing the ends of the coil portion at the connection portions at the same time to fuse the first insulating material and the second insulating material and to pressure-bond the ends to the conductors, wherein the second insulating material is a fluorocarbon resin having multiple insulation layers having different melting points, the melting point of the fluorocarbon resin for use in the outermost insulation layer of the second insulating material is made lower than the melting point of PFA serving as the fluorocarbon resin for use in the inner insulation layer thereof, and in the step of forming the coil portion, the outermost insulation layer is fused by heating and the adjacent portions of the coil wire are securely bonded mutually. In the present invention, the diameter of the conductor is small, 0.1 mm or less, whereby the increase in effective resistance owing to the skin effect on the induction heating coil when a panmade of a material having low resistance and low magnetic permeability, such as aluminum, in particular is heated is suppressed, and the heat generation thereof is reduced. This configuration of the coil wire has more number of wires and becomes more complicated than a configuration wherein the diameter of a wire is larger than 0.1 mm and the number of the wires is smaller. However, coil wire terminal processing, that is, the electrical connection between the conductor of each wire and the terminal portion, can be carried out stably by adopting the present invention. As a result, a heating loss reducing effect in the case that the diameter of the wire is made smaller can be produced sufficiently, and the terminal processing can be avoided from becoming complicated.

In another aspect of the present invention, the second insulating material for covering the outer faces of the stranded wires is a fluorocarbon resin. Since the fluorocarbon resin has a high heat-resistant temperature and is high in flexibility, insulation performance is improved and the coil wire winding work is facilitated. In the terminal processing set forth in claim 37 of the present invention, each terminal portion is held, fused and pressurized at the connection portion while the terminal portion of the coil wire is covered with the fluorocarbon resin. Hence, the electrical connection between the conductors and terminal portions can be carried out stably. Including the terminal processing, the production of an induction heating coil suited for induction heating aluminum or the like is further facilitated.

In another aspect of the present invention, the second insulating material has multiple layers having different melting points and that the melting point of the insulating material of the outermost layer is made lower than the melting point of the inner insulation layer. After the coil wire is wound to form a coil portion, the coil portion is heated so that the temperature of the outermost layer becomes higher than the melting point of the outermost layer and so that the temperature of the inner insulation layer becomes lower than the melting point of the insulation layer. After at least the insulation layer of the outermost layer is fused by the heating, cooling is carried out. Hence, even if the wires are not fused or if they are fused slightly, the adjacent coil wires are mutually bonded while being protected by the inner insulation layer being less fused so that the shape of the coil portion can be fixed. Therefore, the work for forming the coil portion is facilitated, and the reliability can be raised.

In another aspect, the present invention includes a coil portion wherein wires whose conductors are covered with the first insulating material or stranded wires each obtained by bundling and twisting a multiplicity of the wires are provided on the outer circumferences thereof with the second insulating material partly or wholly to form a coil wire serving as a coil conductive wire and the coil wire is wound a predetermined number of turns so as to have a predetermined shape, the coil portion being configured that the second insulating material has an adhesion function generated by carrying out predetermined heating and is a bonding insulating material containing woven cloth or nonwoven cloth immersed in a non-cured or half-cured rubber or thermoplastic resin, and that the second insulating material and other the second insulating material are bonded by heating. Hence, when a coil portion is formed by winding the coil wire, the clearance between the adjacent portions of the coil wire is widened owing to the existence of the insulating material. As a result, the increase in high-frequency resistance owing to the proximity action between the wires can be reduced, the insulation strength between the adjacent portions of the coil wire is improved, and the reliability can be raised.

In addition, the second insulating material is subjected to predetermined processing so as to become a bonding insulating material having an adhesion function, whereby the shape of the coil portion after the winding of the coil wire is maintained stably.

Furthermore, the bonding insulating material contains woven cloth or nonwoven cloth immersed in a non-cured or half-cured rubber or thermoplastic resin, and the second insulating material and another second insulating material adjacent to each other are bonded by heating, whereby the shape of the coil portion after the winding of the coil wire can be maintained stably.

In another aspect, the present invention is directed to reducing volatile components by heating before the outer circumferences of the stranded wires are provided with the second insulating material. Hence, the volatile components generated from the inside of the coil portion when the coil portion is heated during use or when the coil portion is heated at the time of adhesion between the portions of the second insulating material do not accumulate between the stranded wire and the second insulating material or between the coil wire and the second insulating material, whereby deformation of the coil portion by the volatile components can be prevented.

In another aspect of the present invention, wires of 0.1 mm or less in conductor diameter are used for the stranded wires. In the case that the conductor diameter of the wire is 0.1 mm or less, it is difficult to thickly apply the first insulating layer in production and the cost rises. However, by providing the outer circumferences of the stranded wires with the insulating material, the insulation between the stranded wires or between the coil wires can be strengthened easily, whereby reliability is improved and cost reduction is attained.

In another aspect of the present invention, an object to be heated is induction heated by passing a high-frequency current of 40 to 100 kHz through the induction heating coil. Hence, the induction heating apparatus incorporating this induction heating coil can be suited for a copper pan and an aluminum pan.

In another aspect, the present invention has terminal portions for external connection secured to the ends of the lead wires of the coil portion while electrical connection is maintained, by carrying out self-heating using Joule heat generated by current flowing and by pressurizing the ends of the coil portion at the same time to fuse the first insulating material and the second insulating material and to pressure-bond the ends to the conductors. Hence, the second insulating material covering the surfaces of the stranded wires and the first insulating material formed on the conductor surfaces of the respective wires are partly fused by the heat generation at the terminal portions and move around the circumference of the pressurized portion. Hence, the electrical connections among the conductors of the wires and between the conductors of the wires and the terminal portions for external connection can be carried out securely in a short time by pressure-bonding. In the configuration set forth in claim 1 or 13, the configuration of the coil wire becomes complicated, and the work for eliminating the first insulating material and the second insulating material at the end portions becomes complicated in the case of a conventional method of using chemicals. However, in the configuration in accordance with the present invention, it is not necessary to eliminate the covering of the wires using chemical processing or the like, and soldering can be omitted. Furthermore, even in the case that the wire diameter is small and the number of wires becomes large as in the invention set forth in claim 13, the connection between the coil wire and the terminal portions can be carried out efficiently and stably in a similar way.

In another aspect, the present invention further comprises a coil holding member for holding the coil portion, the terminal portion being secured to the above-mentioned coil holding member and having a threaded hole. Hence, the coil holding member plays a role as the terminal block for connection, the lead wires are shortened and handled easily, and wiring connection work can be facilitated.

In another aspect, the present invention further comprises a coil holding member for holding the coil portion, the terminal portion being secured to the above-mentioned coil holding member and having a female thread portion. The terminal portion is secured to the coil holding member and has the female thread portion equipped with a cylindrical protruding portion provided with a thread on the inner face thereof. Hence, the coil holding member can have a role as the terminal block for external connection. Furthermore, the lead wires of the coil portion can be shortened, and any additional components, such as insulation tubes or the like, for insulating the lead wires are not required, whereby wiring work is facilitated.

In another aspect, the present invention further comprises a coil holding member for holding the coil portion and the terminal portions.

The terminal portion has a connection portion for electrically connecting the conductors by simultaneously heating and pressurizing the end of the coil portion, a coil wire holding portion connected to the connection portion and a bending portion extended nonlinearly to the coil wire holding portion. The bending portion has a female thread portion or a hole, and the coil wire at the end of the coil portion is lead out from the connection portion in a direction nearly identical to that of the coil wire holding portion.

With this configuration, the terminal portions are held on the coil holding member, whereby the lead portions of the coil portion can be shortened and the work for connecting an apparatus for supplying a high-frequency current to the coil portion, such as an inverter, is facilitated. The terminal portion has the connection portion for carrying out electrical connection by simultaneously heating and pressurizing the coil wire, the coil wire holding portion connected to the connection portion, and the bending portion extended nonlinearly to the coil wire holding portion. Since the coil wire at the end of the coil portion is led out from the connection portion in a direction nearly identical to that of the coil wire holding portion, the end of the coil portion is placed on the coil wire holding portion during assembly or after assembly. This prevents a large bending force from applying to the coil wire at the connection portion. Furthermore, the bending portion extended nonlinearly to the coil wire holding portion has the female thread portion or the hole. This is effective in that when an external wire is connected to the female thread portion or the hole in the terminal portion using a screw or a screw and a nut, the end of the coil does not become obstructive.

In another aspect, the induction heating coil production method of the present invention further comprises a coil holding member for holding the coil and the terminals. The terminal has a connection portion for electrically connecting the conductors by simultaneously heating and pressurizing the end of the coil, a coil wire holding portion connected to the connection portion and a bending portion extended nonlinearly to the coil wire holding portion. The bending portion has a female thread portion or a hole, and the production method has a step of leading out the coil wire at the end of the coil from the connection portion in a direction substantially identical to that of the coil wire holding portion.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is a cross-sectional view of a coil wire in accordance with a third example, being used for the induction heating coil in accordance with the first embodiment of the present invention;

FIG. 8 is a cross-sectional view showing another example of a stranded wire for the induction heating coil in accordance with the second embodiment of the present invention;

Figure 1:
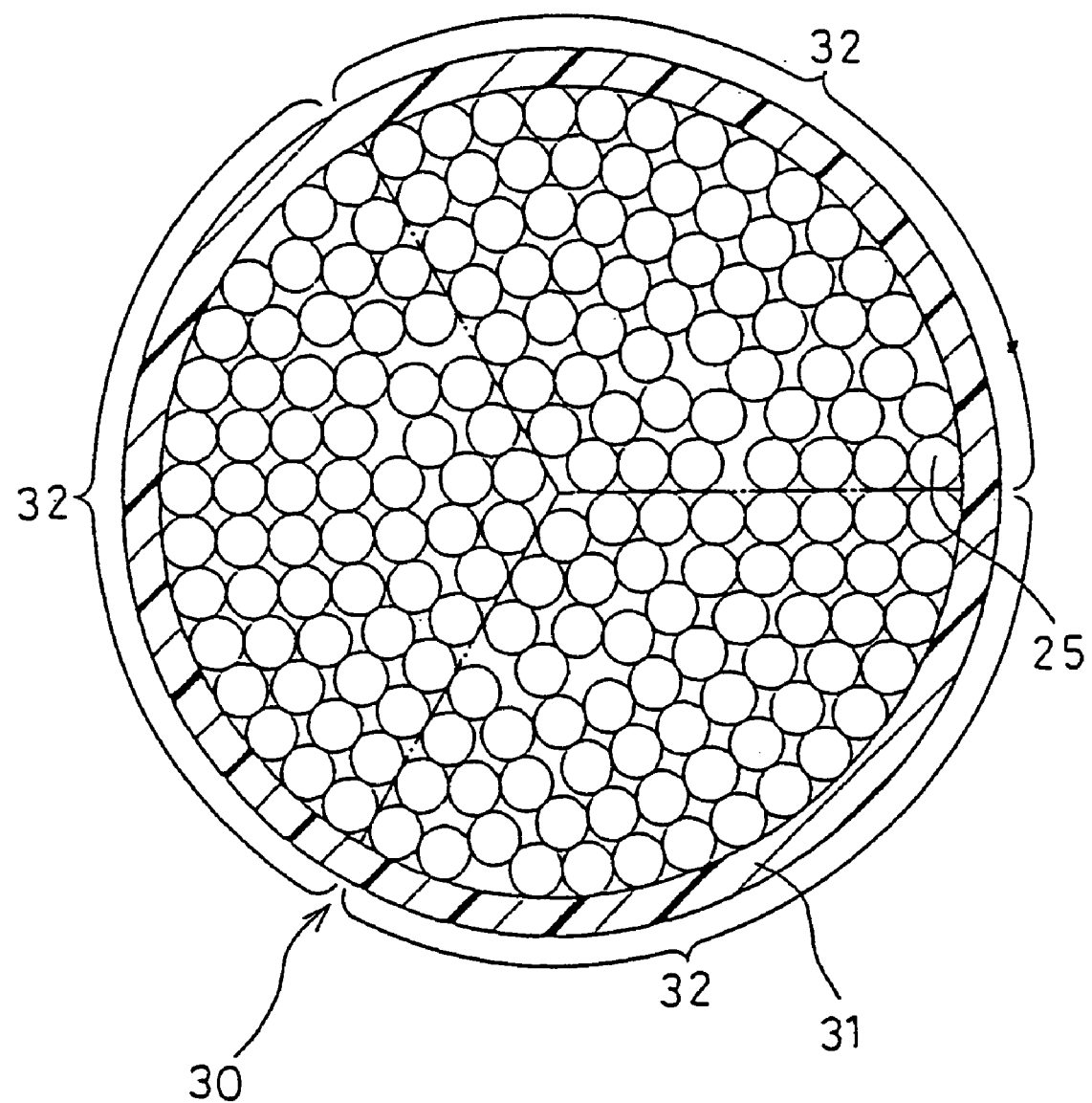
FIG. 1 is a cross-sectional view of a coil wire in accordance with a first example, being used for an induction heating coil in accordance with a first embodiment of the present invention.
Figure 14:
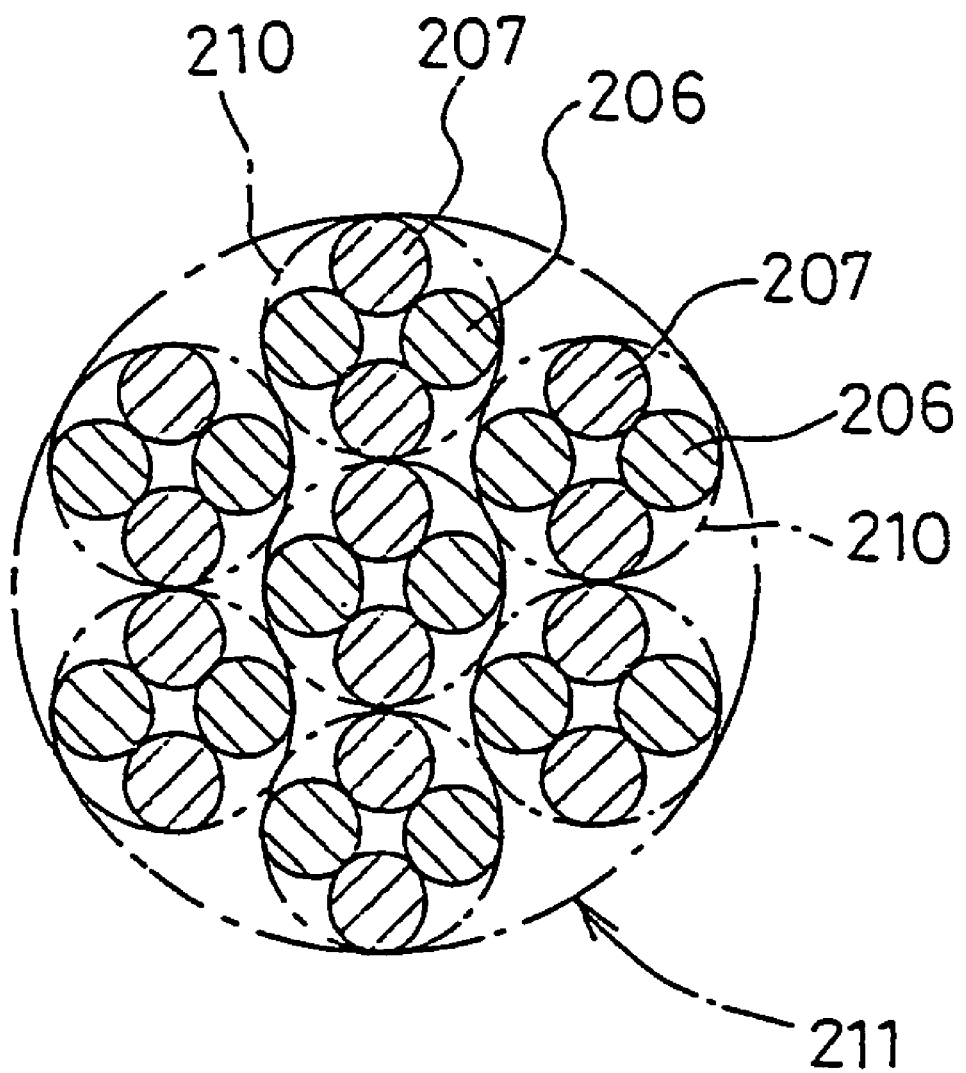
Figure 16:
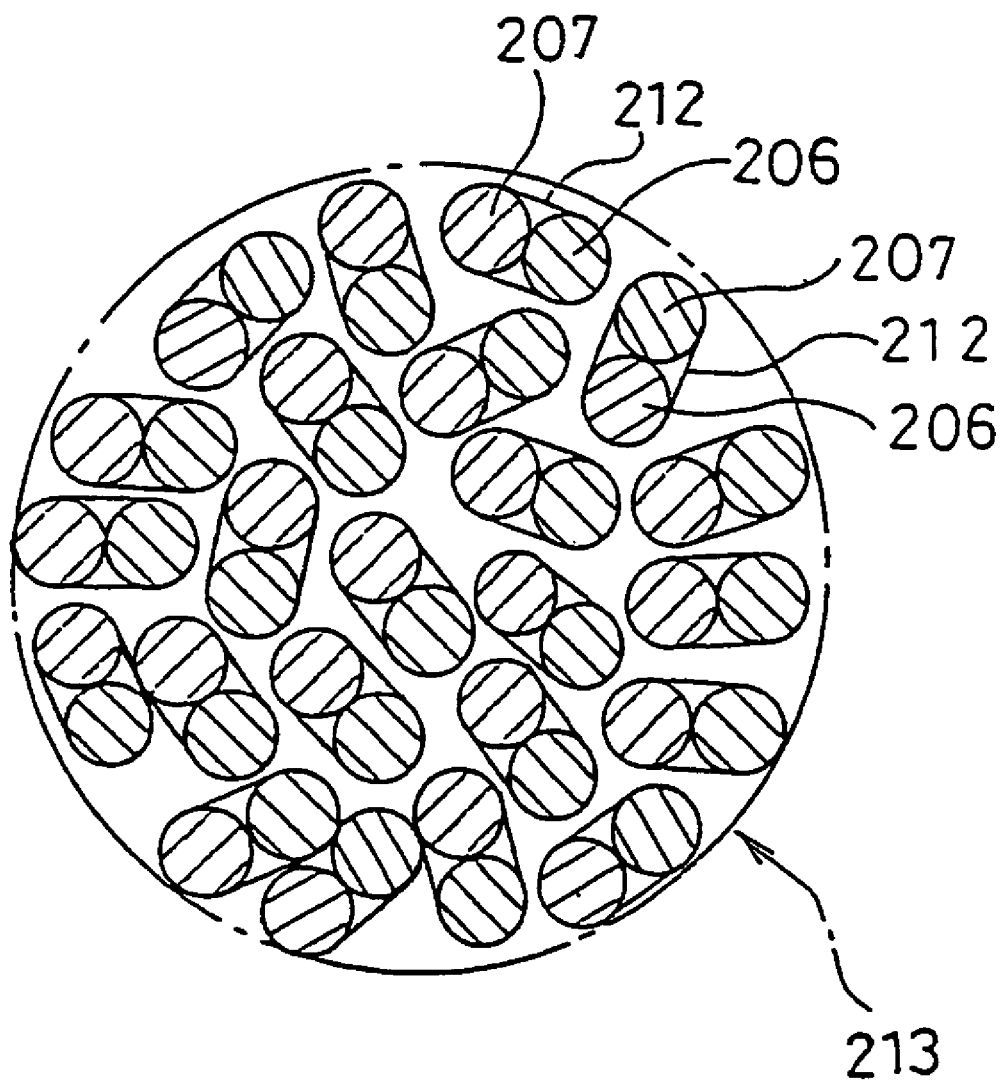
Figure 18:
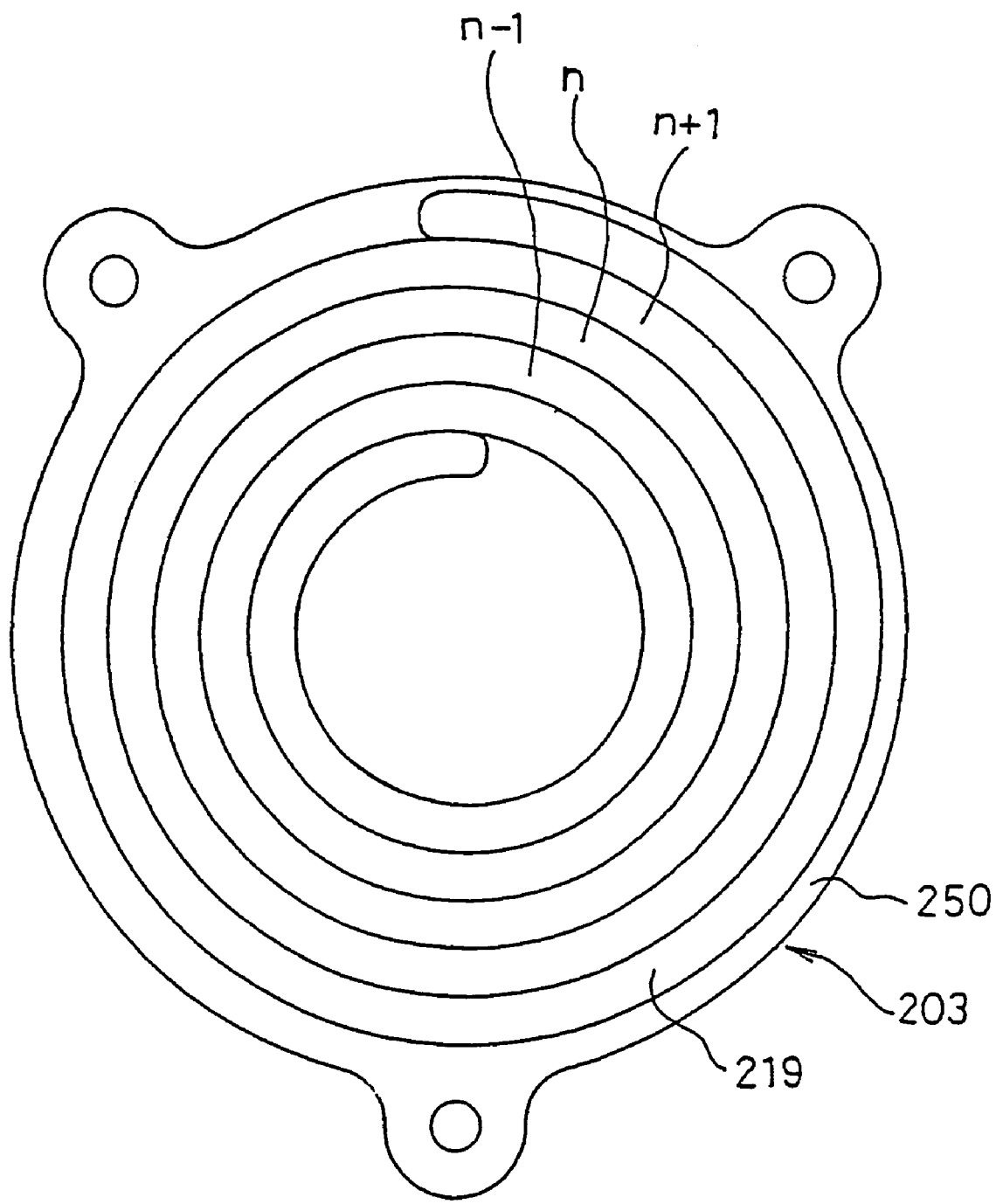
Figure 19:
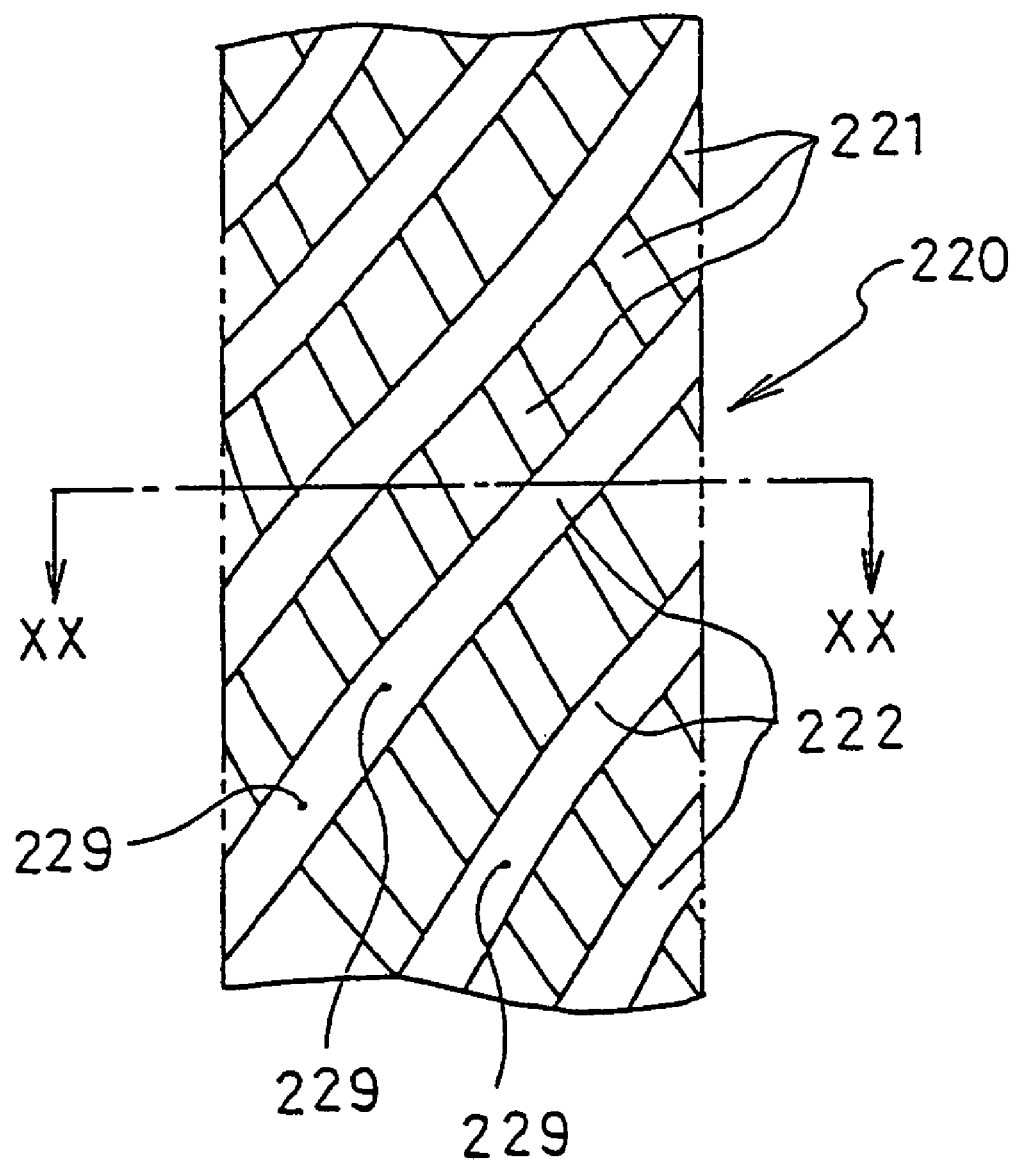
Figure 21:
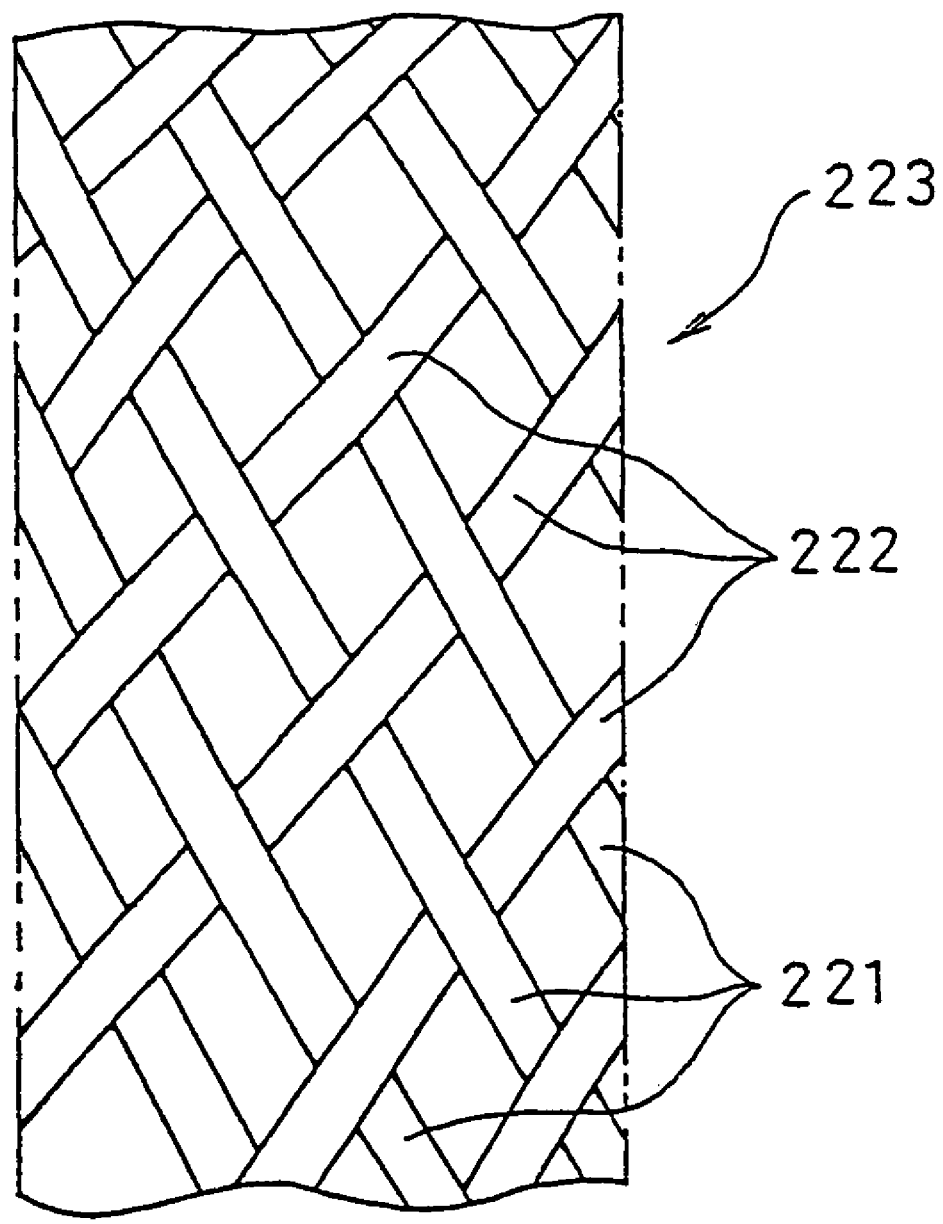
Figure 22:
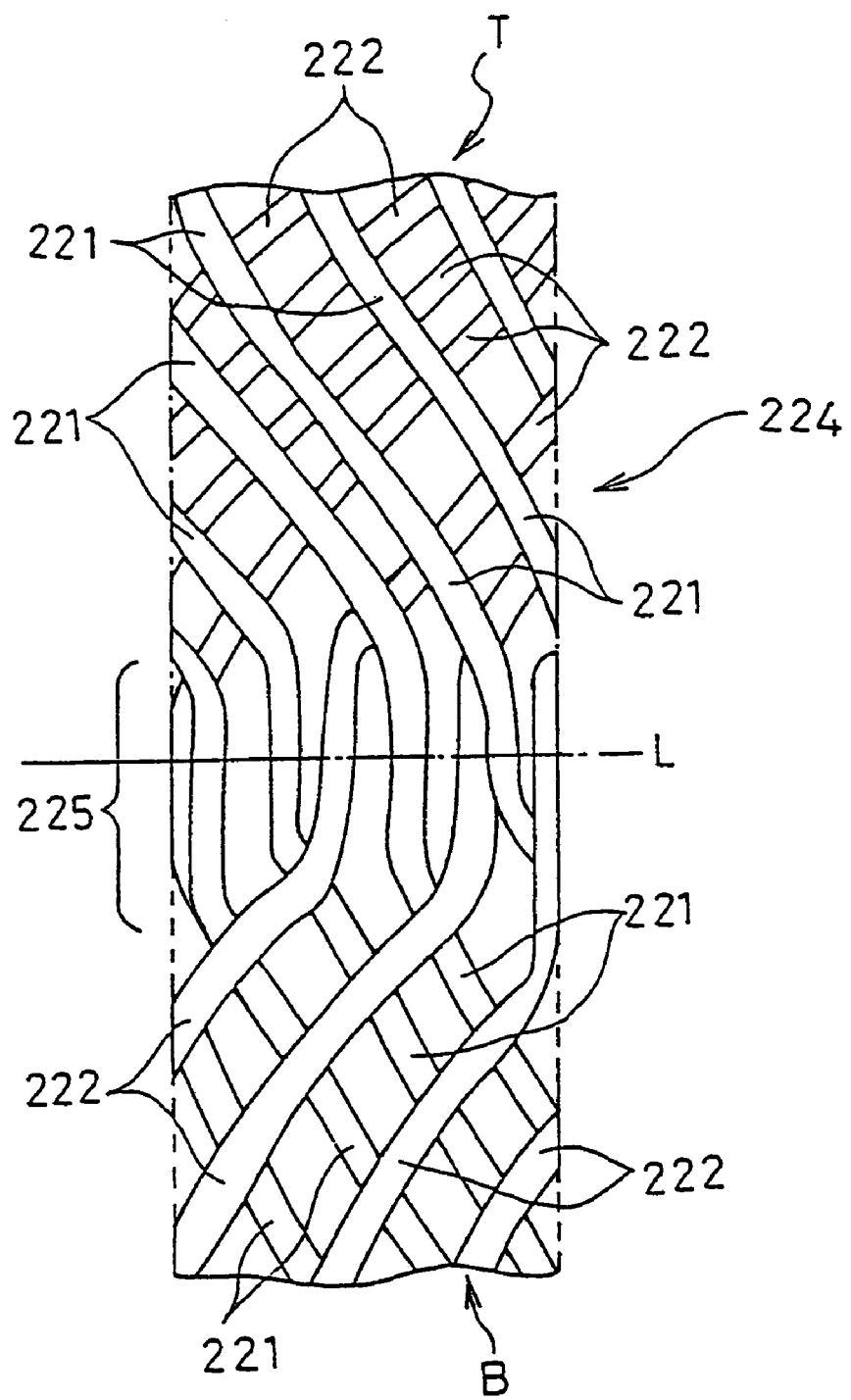
Figure 23:
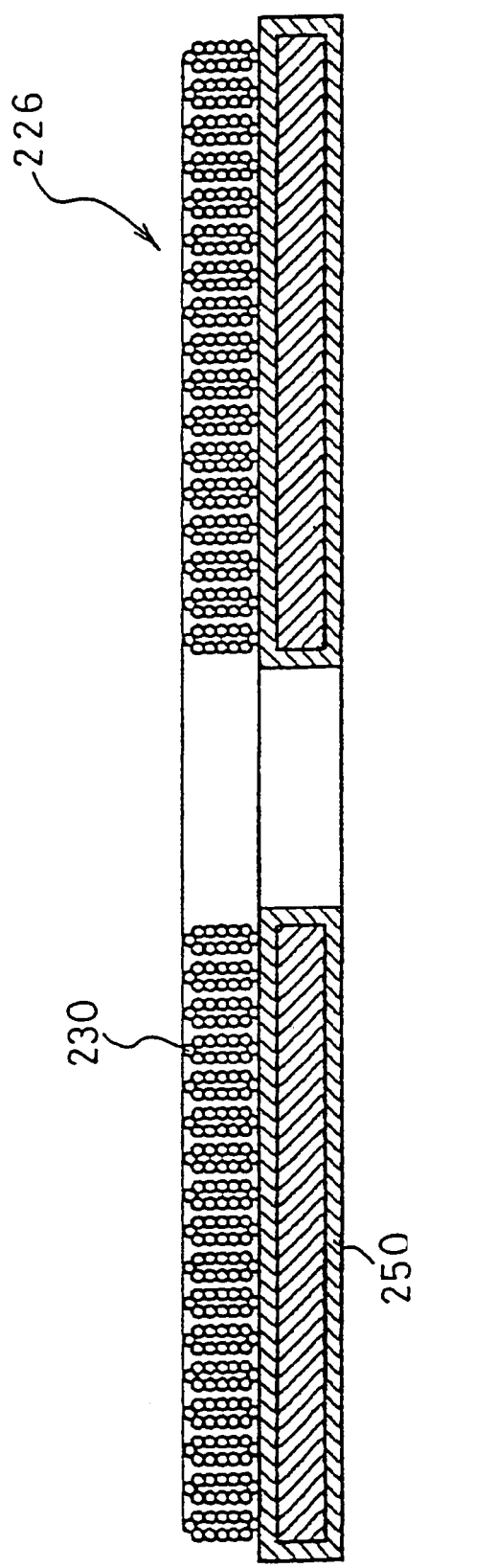
Figure 25:
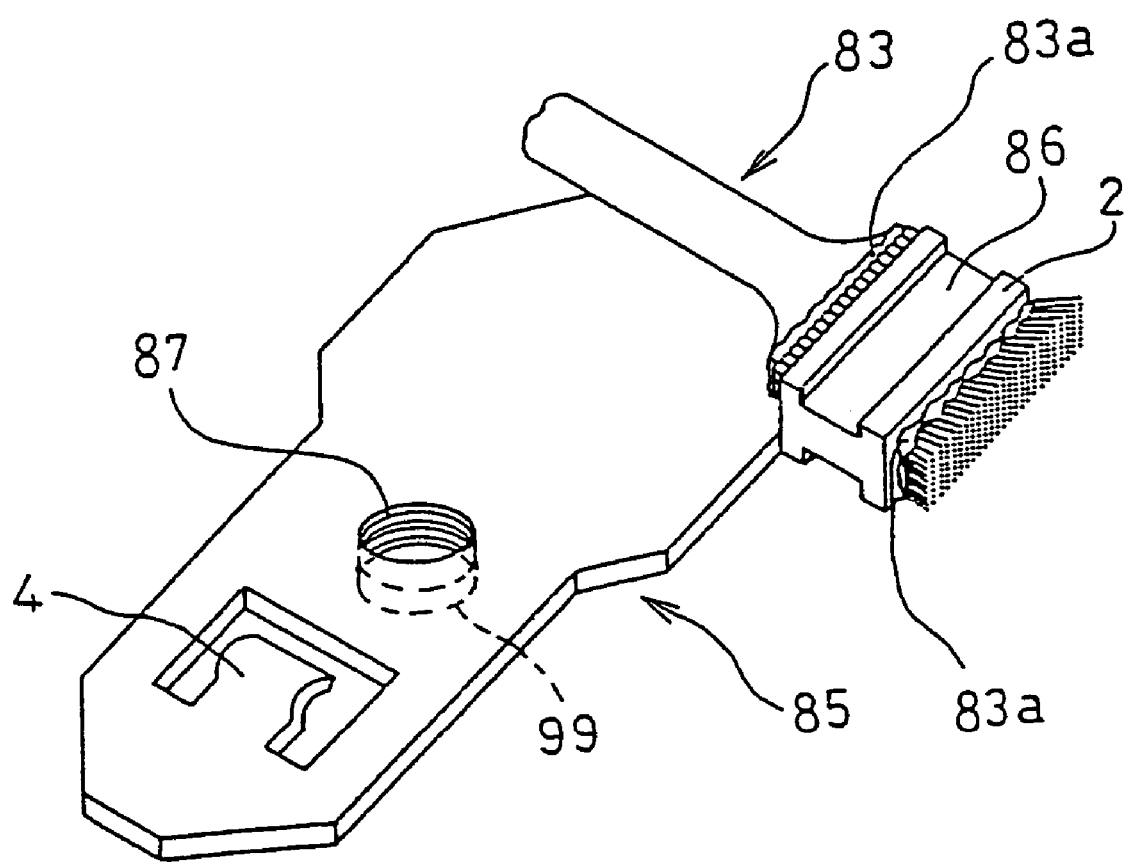
Figure 26:
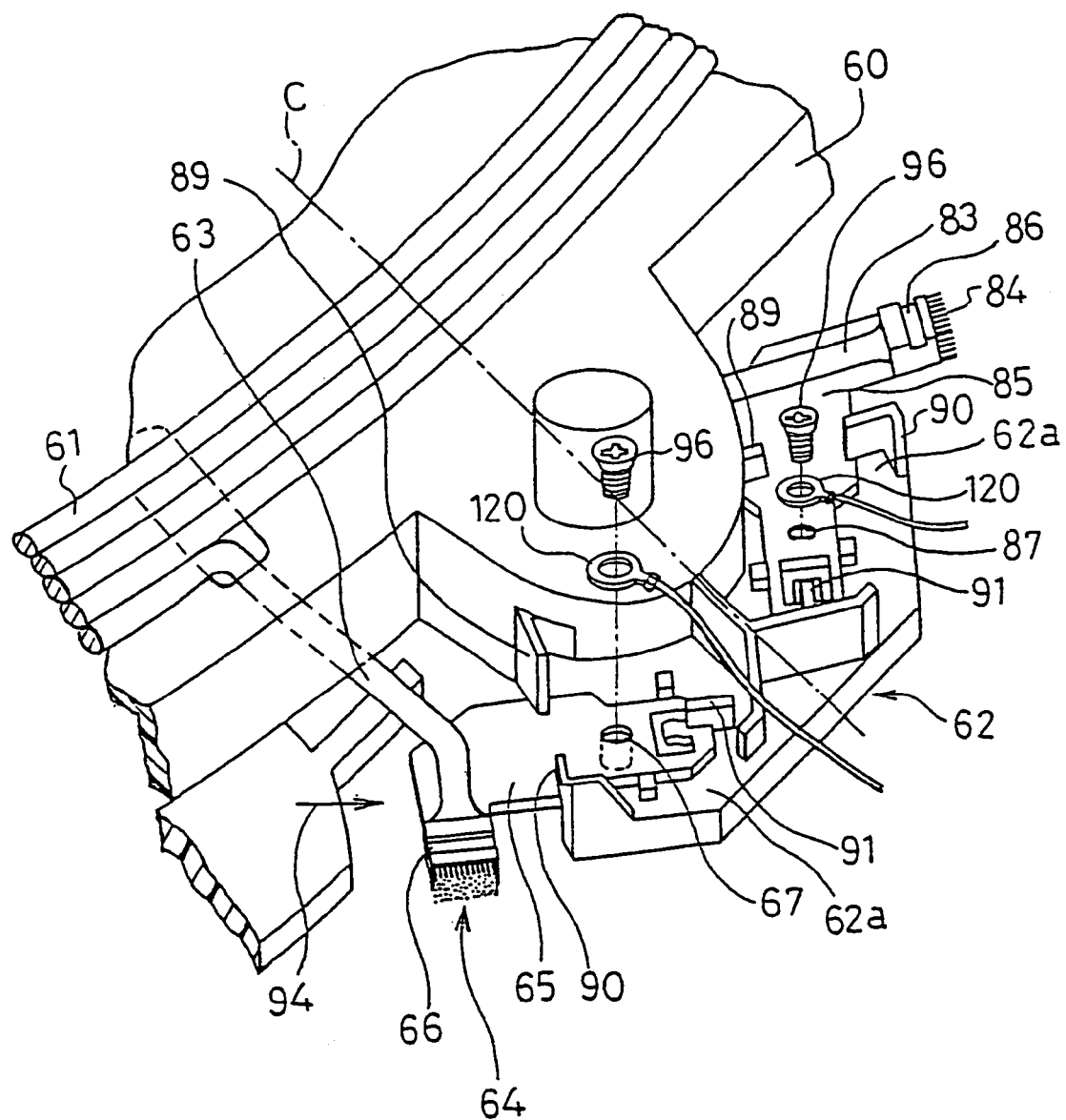
Figure 27:
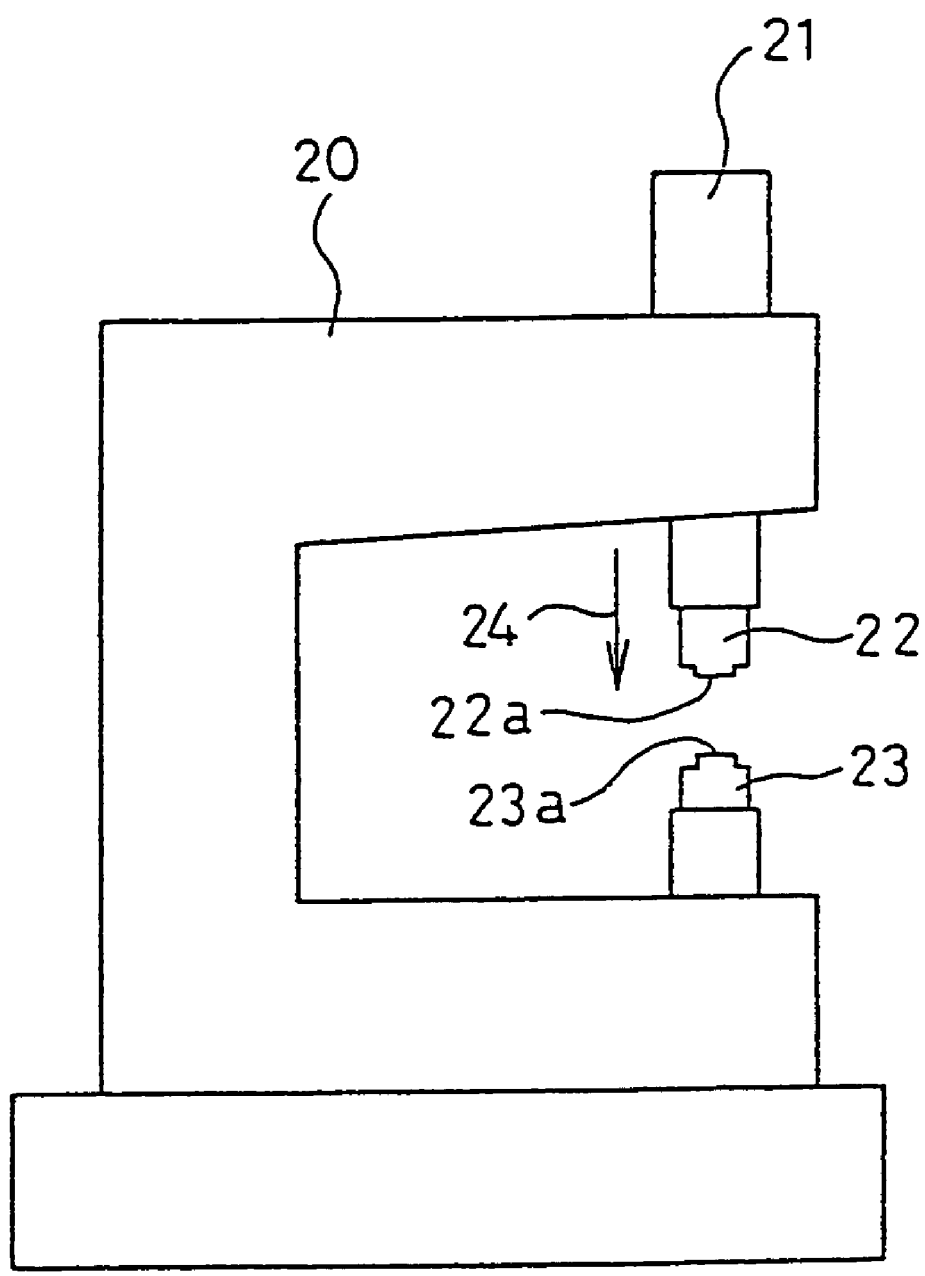
Figure 29:
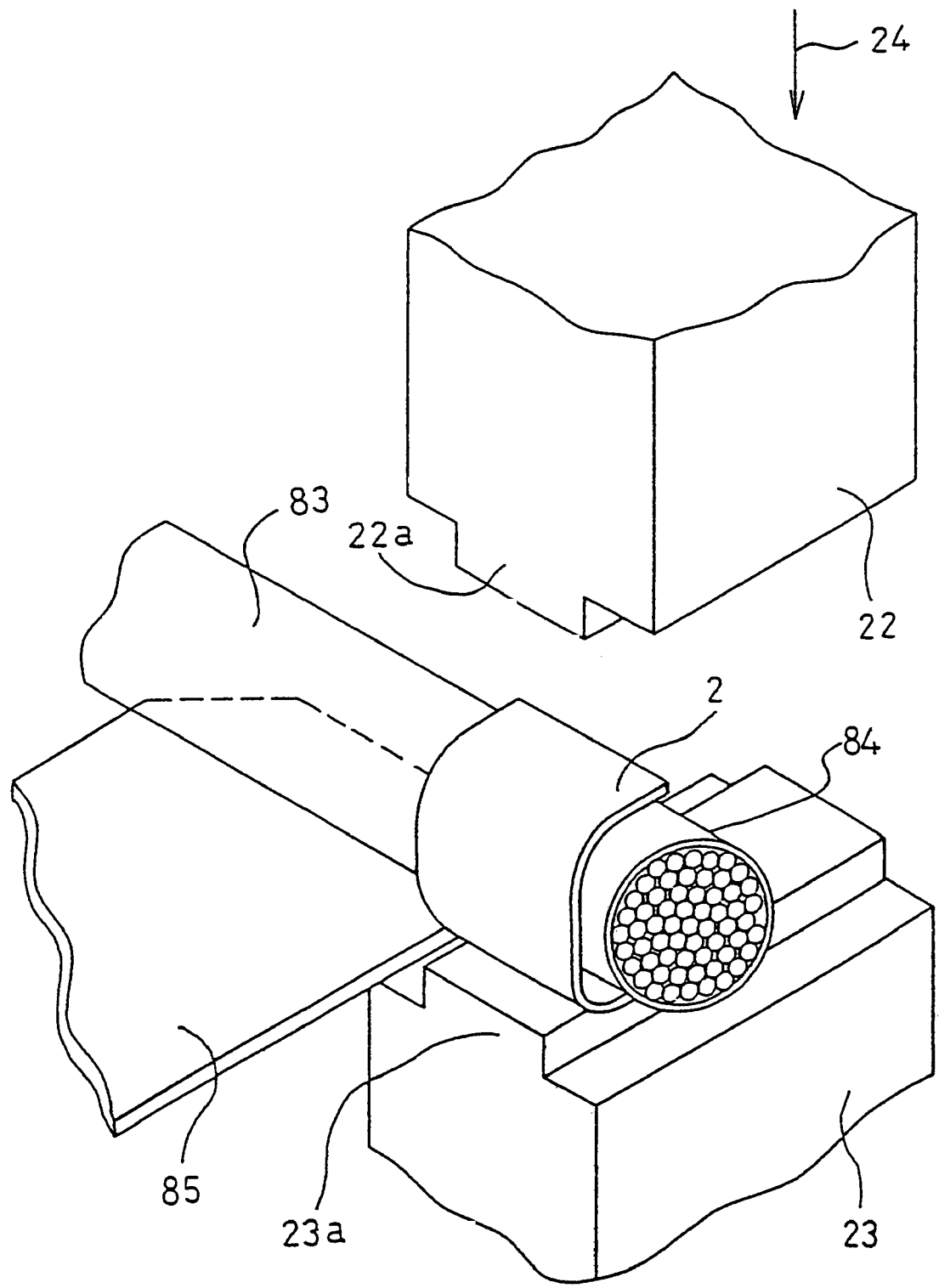
Figure 30:
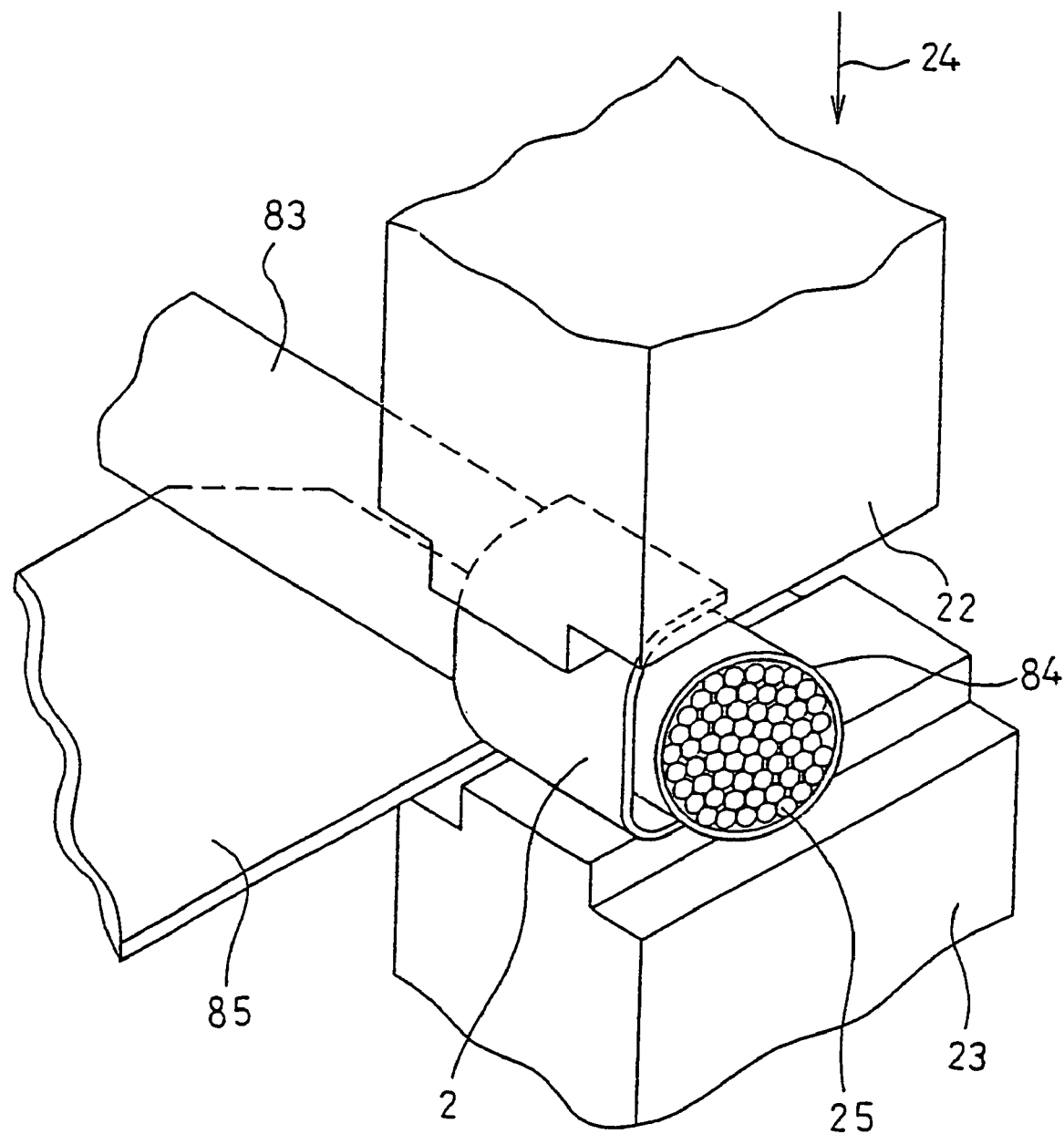

Part (a) of FIG. 13 is a cross-sectional view showing the configuration of a stranded wire for an induction heating coil in accordance with a fourth embodiment of the present invention;

Part (b) of FIG. 13 is a side view of a right stranded wire and a left stranded wire;

FIG. 14 is a cross-sectional view showing another configuration of a stranded wire for the induction heating coil in accordance with the fourth embodiment of the present invention;

FIG. 15 is a side view of a twisted configuration of a right stranded wire and a left stranded wire for the induction heating coil in accordance with the fourth embodiment of the present invention;

FIG. 16 is a cross-sectional view showing another example of a stranded wire for the induction heating coil in accordance with the fourth embodiment of the present invention;

FIG. 17 is a cross-sectional view of a stranded wire for an induction heating coil in accordance with a fifth embodiment of the present invention;

FIG. 18 is a plan view of an induction heating coil portion in accordance with a sixth embodiment of the present invention;

FIG. 19 is a side view of a stranded wire for an induction heating coil portion in accordance with a seventh embodiment of the present invention;

FIG. 20 is a cross-sectional view of the stranded wire shown in FIG. 19;

FIG. 21 is a side view showing another configuration of a stranded wire for the induction heating coil in accordance with the seventh embodiment of the present invention;

FIG. 22 is a side view showing another configuration of a stranded wire for the induction heating coil in accordance with the seventh embodiment of the present invention;

FIG. 23 is a cross-sectional view of the induction heating coil in accordance with the seventh embodiment of the present invention;

Part (a) of FIG. 24 is a perspective view showing a state before the connection of the terminal portion to the coil lead portion of an induction heating coil in accordance with an eighth embodiment of the present invention;

Part (b) of FIG. 24 is a cross-sectional view taken on b—b of FIG. 1;

FIG. 25 is a perspective view showing a state after the connection of the terminal portion to the coil lead portion of the induction heating coil in accordance with the eighth embodiment of the present invention;

FIG. 26 is a perspective view showing the configurations of the coil portion, coil holding member, terminal portions and terminal securing portions of the induction heating coil in accordance with the eighth embodiment of the present invention;

FIG. 27 is a side view of a connection apparatus for connecting the terminal portion to the coil lead portion in accordance with the eighth embodiment of the present invention;

Part (a) of FIG. 28 is a perspective view of the upper electrode of the connection apparatus shown in FIG. 27;

Part (b) of FIG. 28 is a perspective view of the lower electrode of the connection apparatus;

FIG. 29 is a perspective view showing a state before the start of a heating and pressurizing step in accordance with the eighth embodiment of the present invention; and FIG. 30 is a perspective view showing a state during the heating and pressurizing step in accordance with the eighth embodiment of the present invention.

DETAILED DESCRIPTION OF THE INVENTION

Preferred embodiments of an induction heating coil in accordance with the present invention will be described below referring to FIG. 1 to FIG. 29.

In the following descriptions of the respective embodiments, a "wire" is a single thin conductive wire and the minimum component of a conductor constituting an induction heating coil. By bundling and twisting multiple wires, a conductor for an induction heating coil is formed, and this is referred to as a "coil wire." An induction heating coil is formed by spirally winding this coil wire.

Embodiment 1

Figure 4:
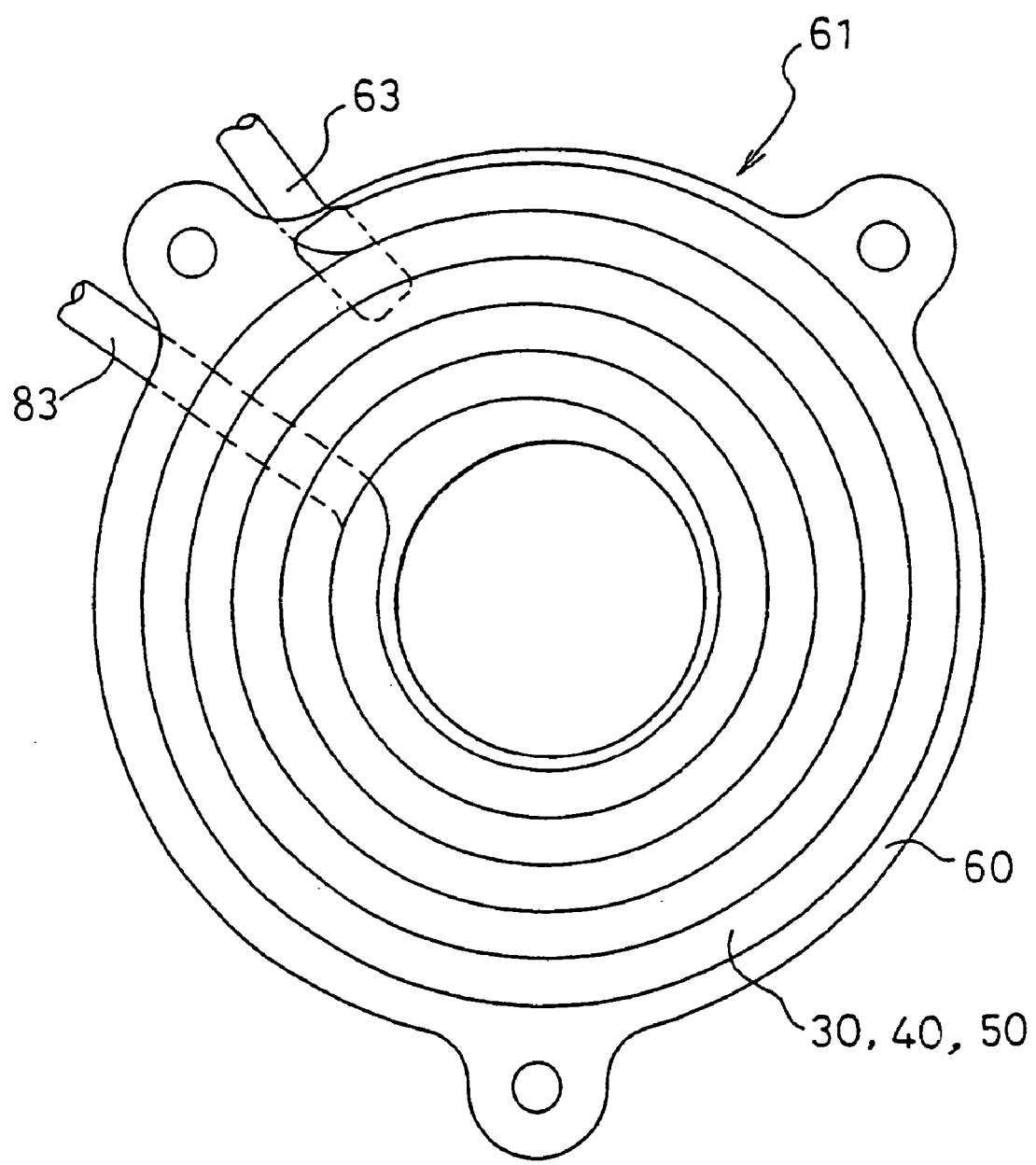
FIG. 4 is a plan view of an induction heating coil common to respective embodiments in accordance with the present invention.

Various coil wires for an induction heating coil in accordance with a first embodiment of the present invention will be described referring to FIG. 1 to FIG. 3. By spirally winding each of these coil wires as shown in FIG. 4, an induction heating coil 61 is obtained. An induction heating apparatus (an induction heating cooking apparatus in this embodiment) incorporating this induction heating coil is shown in the cross-sectional view of FIG. 6; this will be described later in detail.

FIG. 1 is a cross-sectional view of a coil wire 30 in accordance with a first example. In the figure, a wire 25 is formed by covering the outer face of a conductor formed of a copper wire of 0.05 mm in diameter, for example, with a heat-resistant insulating film (3 μm in thickness), such as polyesterimide, serving as a first insulating material. A stranded wire is formed by bundling and twisting 540 wires 25. In FIG. 1, 60 wires are shown as a stranded wire 32 to avoid making the figure complicated; however, the actual stranded wire 32 has 440 wires. Twisting for forming the stranded wire 32 is herein referred to as "first-stage twisting." Next, three stranded wires 32 are twisted mutually. Twisting the three stranded wires 32 is herein referred to as "second-stage twisting." The twist of the three stranded wires 32 is covered with a heat-resistant insulating material 31 (50 to 200 μm in thickness), such as a fluorocarbon resin, serving as a second insulating material to complete a coil wire 30. The coil wire 30 has 1620 wires 25. The combination of the first-stage twisting for the wires 25 and the second-stage twisting for the stranded wires 32 to form the coil wire 30 is herein referred to as "multi-twisting" and the structure thereof is herein referred to as a "multi-twisted structure." Furthermore, the coil wire formed by the multi-twisting is herein referred to as a "multi-stranded wire." Multi-stage twisting, that is, second-stage twisting or more, can also be carried out for multi-twisting.

Figure 2:
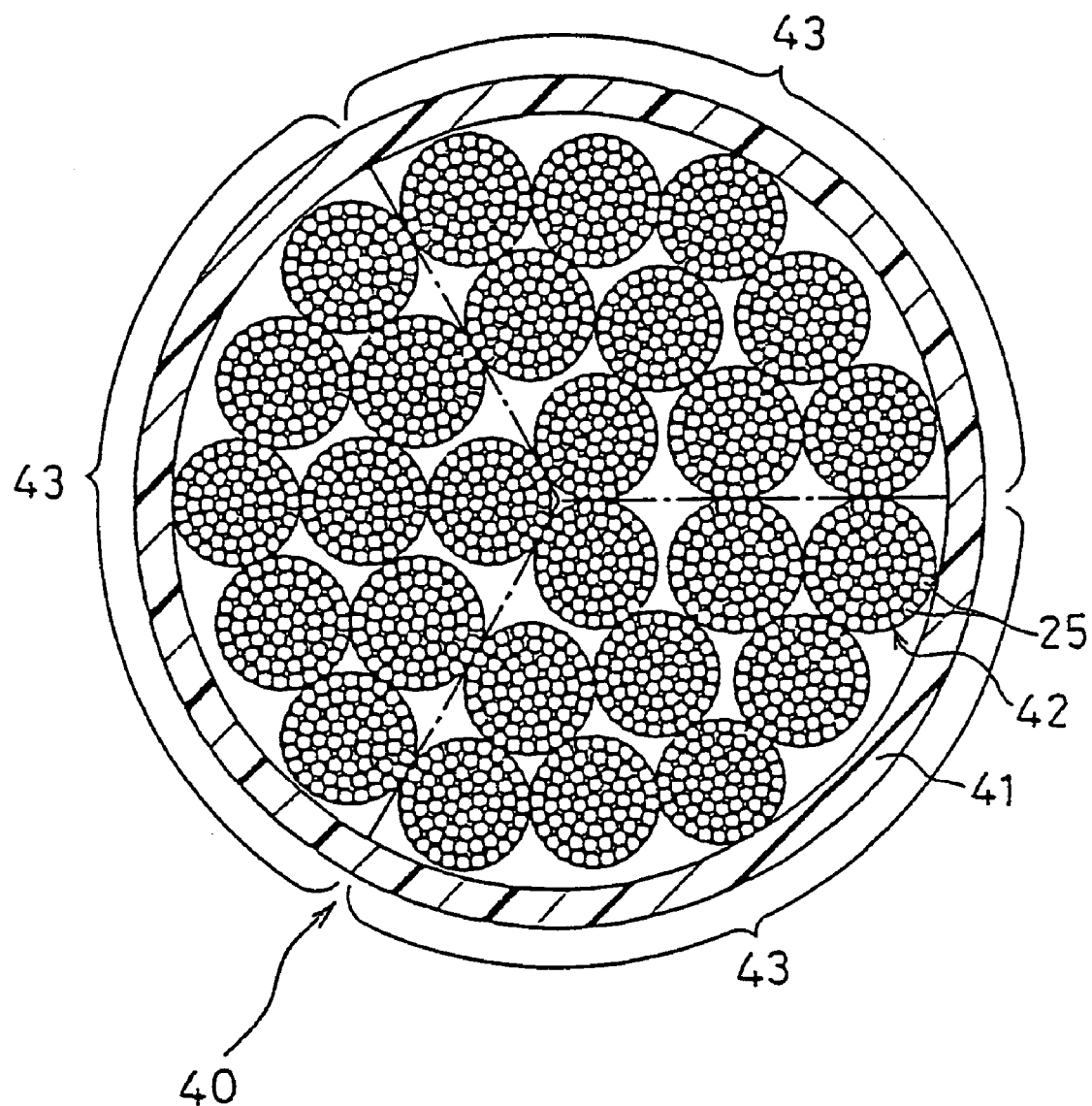
FIG. 2 is a cross-sectional view of a coil wire in accordance with a second example, being used for the induction heating coil in accordance with the first embodiment of the present invention.

FIG. 2 is a cross-sectional view of a coil wire 40 in accordance with a second example. In the figure, the wire 25 is the same as the wire 25 in accordance with the above-mentioned first example. Sixty wires 25 are bundled and subjected to first-stage twisting to form a stranded wire 42. Next, nine stranded wires 42 are bundled and subjected to second-stage twisting to form a stranded wire 43. Furthermore, three stranded wires 43 are bundled and subjected to third-stage twisting and then covered with a thermoplastic insulating material 41, thereby completing a multi-stranded wire, that is, the coil wire 40. The coil wire 40 has 1620 wires 25 (60×9×3=1620).

A coil wire 50 in accordance with a third example, shown in the cross-sectional view of FIG. 3, is obtained by further covering the above-mentioned coil wire 40 shown in FIG. 2 with an insulating material 51, thereby being doubly covered with the insulating materials 41 and 51. The insulating material 51 is made of a material having a melting point lower than that of the insulating material 41.

The coil wire 30 shown in FIG. 1 is subjected to first-stage and second-stage twisting. In addition, the coil wires 40 and 50 shown in FIG. 2 and FIG. 3 are subjected to first-stage, second-stage and third-stage twisting. Even though the total sectional area of the wires 25 of the coil wire 30 or 40, that is, the total sectional area obtained by totalizing the sectional areas of the conductors of the respective wires 25, is the same, the loss in the coil portion 61 owing to the skin effect while a high-frequency current is passed through can be suppressed in the case that the coil wire 30 or 40 is formed by making the diameter of each wire 25 small, by increasing the number of the wires and by twisting the wires. Furthermore, in this embodiment, two-stage or three-stage twisting is carried out. Hence, even if the number of the wires 25 and the conductor diameters of the respective wires 25 are the same, that is, even if the total sectional area of the conductors is the same, there is a high degree of possibility that the directions of the wires 25 twisted inside the coil wire become nonuniform in comparison with a coil wire subjected to only one-stage twisting. Hence, it is possible to suppress the loss in the coil portion owing to the proximity effect while a high-frequency current is passed through. For example, on the inside of the coil wire 30, the directions of the respective wires 25 constituting one stranded wire 32 (having been twisted at the first stage) to be twisted at the second stage to form the coil wire 30 are significantly different from the directions of the respective wires 25 constituting the other stranded wires 32 to be twisted at the second stage with the above-mentioned stranded wire 32. Furthermore, the directions of the respective wires 25 at adjacent portions of the coil wire 30 in the coil portion 61 are mutually different significantly. The coil wires 40 and 50 are subjected to multi-stage twisting, the number of stages being one stage more than that for the coil wire 30; hence, the increase in the effective resistance owing to the proximity effect is suppressed further although the number of the wires 25 is the same as that for the coil wire 30. As described above, the thin wires 25 of 0.05 mm in diameter are used for the coil wires 30, 40 and 50, and subjected to multi-stage twisting. This can reduce both the increases in effective resistances owing to the skin effect and the proximity effect.

When an induction heating coil is formed using the coil wire 30 or 40 shown in FIG. 1 or FIG. 2, a coil portion 61 wherein the coil wire 30 or 40 is spirally wound is mounted and installed on a coil holding portion 60 made of a heat-resistant resin as shown in the plan view of FIG. 4. The adjacent portions of the spirally wound coil wire 30 are bonded with an adhesive. The coil lead portions 63 and 83 at both end portions of the coil portion 61 are connected to terminal portions 65 and 85, respectively, for connection to an external apparatus (a high-frequency current supply apparatus, such as an inverter), as described later in detail referring to FIGS. 24, 25 and 26.

In the coil wire 50 shown in FIG. 3, the second insulating material 51 disposed outside is formed of a resin having a melting point (220° C. to 280° C. in the first embodiment) lower than the melting point (290° C. to 320° C. in the first embodiment) of the insulating material 41 disposed inside. Hence, by carrying out heating so that the second insulating material 51 formed spirally as shown in FIG. 4 has a predetermined temperature (285° C. in the first embodiment), only the insulating material 51 is fused, and the adjacent portions of the coil wire 50 are bonded.

The heat-resistant insulating film serving as the first insulating material for covering the conductor of the wire 25 may be configured so as to have two layers (not shown) wherein the inside layer is formed of polyesterimide (3 µm in thickness) and the outside layer is formed of polyamide imide (0.5 µm in thickness). Only the inside layer, polyesterimide (3 µm in thickness), may be used; however, the diameter of the wire 25 is very small, 0.05 mm. Therefore, it is necessary to take measures so that the friction among the wires when the wires are bundled and formed into a stranded wire does not break the wires or damage the film. Hence, the polyamide imide film (0.5 µm in thickness) is formed on the outside to improve slippage among the wires.

As the second insulating materials 31, 41 and 51 for covering the stranded wires constituting the coil wires 30, 40 and 50, thermoplastic resins, such as a polyamide resin, a polyamide imide resin, a polyester resin and a fluorocarbon resin, are suited. Furthermore, with respect to stable insulation performance and adhesion performance obtained by heating, it is desirable to use PFA, a fluorocarbon resin, having a high melting point (approximately 300° C.) for the inside insulating material 41 serving as the second insulating material shown in FIG. 3 and to use a resin having a melting point (approximately 230° C.) lower than that of the above-mentioned PFA for the outside insulating material 51 also serving as the second insulating material.

Furthermore, a non-cured or half-cured rubber or a thermosetting resin is used as the second insulating materials 31, 41 and 51. The resin is heated and cured in the middle of producing the coil portion 61, that is, when the coil wire 50 is wound, or after the coil wire 50 is wound and the coil portion 61 is formed. Hence, the insulating material is firmly secured to the insulating material, or the insulating material is firmly secured to the wires, whereby the shape of the coil portion 61 can be made stable. Rubbers, such as a silicone-based rubber and a fluorine-based rubber, are used as the rubber. In addition, resins, such as an epoxy resin, an unsaturated polyester resin and a phenolic resin, are used as the thermosetting resin.

A non-cured or half-cured rubber or resin, in particular, woven cloth or nonwoven cloth coated with or immersed in a half-cured rubber or resin, may also be used as the second insulating material. Heating and curing are carried out after immersing, whereby the shape of the coil portion can be made stable. In particular, when woven cloth or nonwoven cloth in the shape of tape is used, the cloth can easily be wound around the outer circumferences of the stranded wires partly or wholly, whereby its handling is easy, and a stable insulation layer can be provided. A rubber or resin, if it is similar to that described above, can be used.

It may also be possible that after preheating is carried out to disperse and reduce the volatile components included in the stranded wires themselves, the outer circumferences of the stranded wires are provided with the insulating material 41, and the outer circumference thereof are further provided with the second insulating material 51 serving as the adhesion layer. The adhesion layer mentioned herein includes a fusion-bonding layer. After the coil wire 50 having this configuration is wound, heating is carried out, whereby it is possible to obtain the coil portion 61 having a stable shape wherein the adjacent portions of the coil wire 50 of the coil portion 61 are firmly bonded.

Still further, heat-shrinkable tape may also be used as the second insulating material. In other words, after the heat-shrinkable tape is wound around the stranded wires, heating is carries out, whereby the tape shrinks to squeeze the stranded wires and the coil portion 61 can have a stable shape.

Embodiment 2

An induction heating coil in accordance with a second embodiment of the present invention will be described referring to FIG. 5 to FIG. 8. This embodiment is characterized in that wires having different sectional areas are bundled and twisted to form a stranded wire, the surface of the stranded wire is covered with the second insulating material to form a coil wire, and this coil wire is wound to form an induction heating coil. When a high-frequency current of 40 to 100 kHz is passed through an induction heating coil to heat an object to be heated having low resistance and low magnetic permeability, such as a copper pan or an aluminum pan, the effective resistance of the induction heating coil increases owing to the skin effect. Numerous wires having a small sectional area should be used to reduce the influence of the skin effect. However, if wires having a small sectional area are used, the adjacent coil wires make close contact with one another, whereby the effective clearances among the wires become small. As a result, the resistance owing to the proximity action increases significantly. In this embodiment, the skin effect is reduced using the wires having the small sectional area. Furthermore, wires having a small sectional area and wires having a large sectional area are mixed to substantially increase the clearances between the wires having the small sectional area. This suppresses the increase in the resistance owing to the proximity action. As a result, the high-frequency resistance of the heating coil becomes substantially small, and self-heating reduces, whereby the heating efficiency can be improved.

Figure 6:
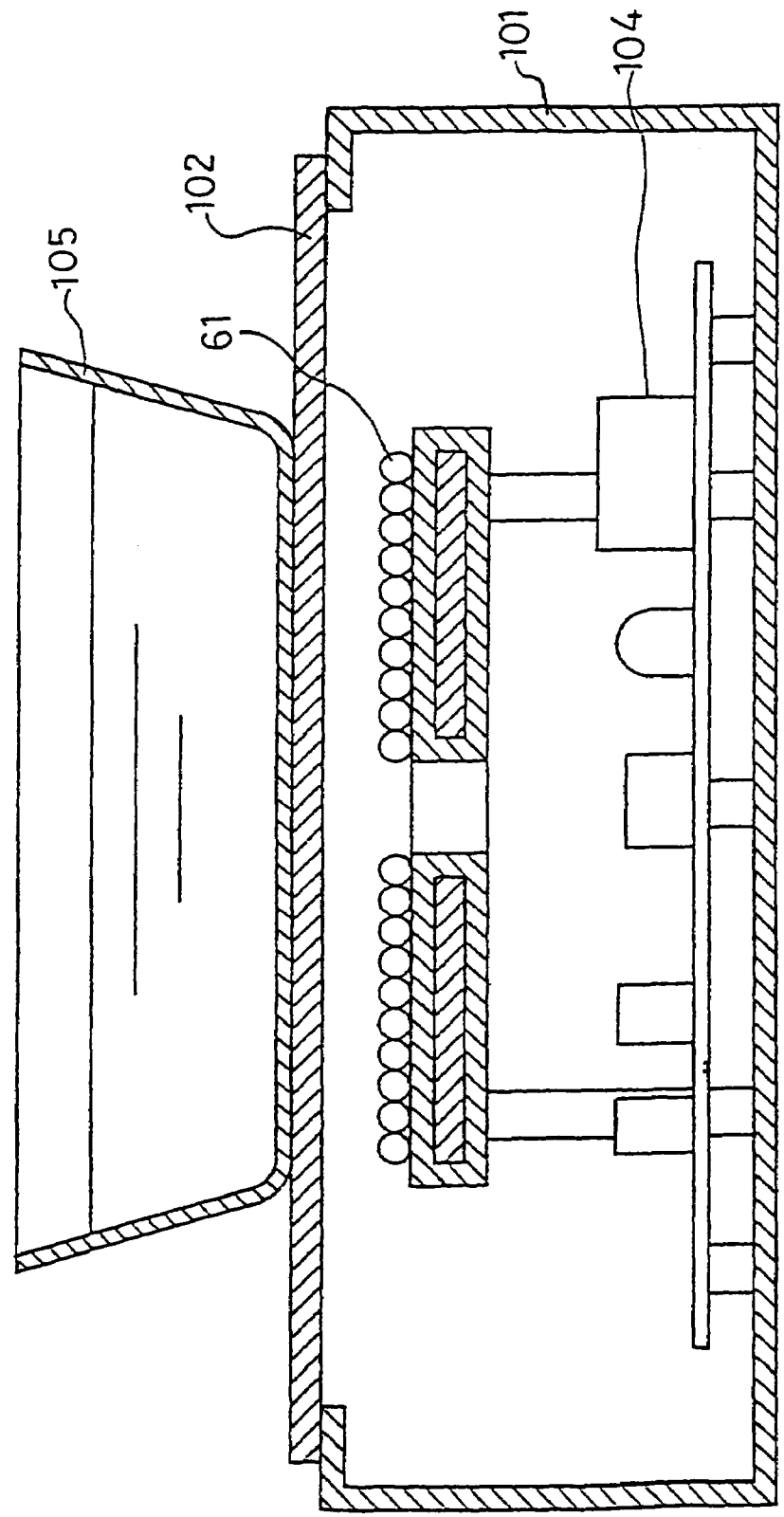
FIG. 6 is a cross-sectional view of an example of an induction heating cooking apparatus provided with the induction heating coil shown in FIG. 4.

The outline of an induction heating cooking apparatus incorporating the induction heating coil in accordance with this embodiment will be described using FIG. 6. A top plate 102 is provided on the upper face of a main body 101 constituting the outer shell of the induction heating cooking apparatus. Inside the main body 101, an induction heating coil 61 produced by winding a coil wire is provided. The induction heating coil 61 is controlled by a controller 104. An object 105 to be heated, such as a pan made of aluminum, is placed on the top plate 102. When a high-frequency current is passed through the induction heating coil 61, a magnetic flux is generated, and an eddy current loss owing to an eddy current induced by this magnetic flux in the object 105 to be heated generates heat, whereby the object 105 to be heated is heated.

Figure 5:
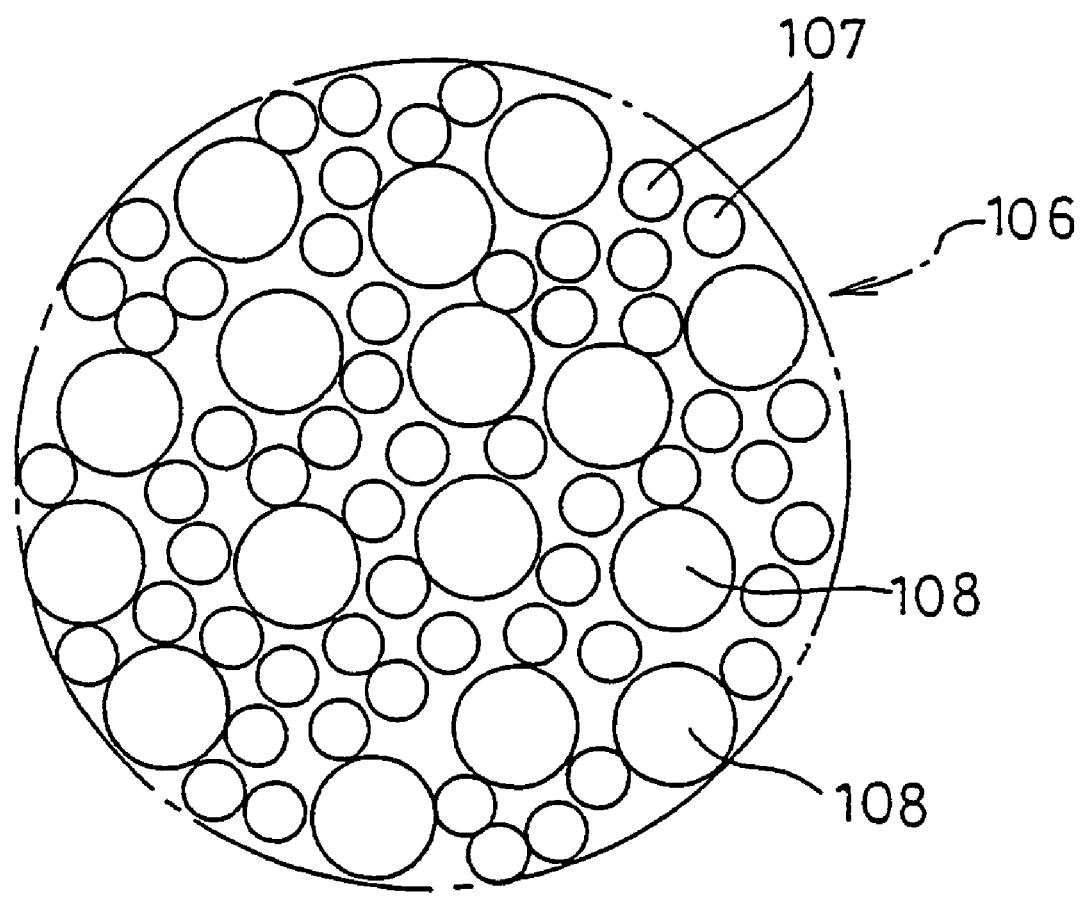
FIG. 5 is a cross-sectional view of a stranded wire for the induction heating coil in accordance with the second embodiment of the present invention.

The configuration of the stranded wire of the coil wire in accordance with this embodiment will be described below referring to FIG. 5, FIG. 7 and FIG. 8. FIG. 5 is a cross-sectional view of a stranded wire 106 constituting the coil wire of the coil portion 61 in accordance with the second embodiment of the present invention. The second insulating materials 31, 41 and 51 shown in FIG. 1 to FIG. 3 are not shown in FIG. 5, but they exist in reality. In FIG. 5, the stranded wire 106 is obtained by mixing and twisting wires 107 (for example, wires of 0.05 mm in diameter) having a small sectional area and wires 108 (for example, wires of 0.1 mm in diameter) having a large sectional area. The wires 107 having the small sectional area and the wires 108 having the large sectional area are mixed randomly to reduce the proximity action of the wires 107 that have the small sectional area and are provided to reduce the skin effect. Bundling is carried out so that a clearance is present between the adjacent wires 107 and 108 as shown in the figure. Hence, the effective clearance between the adjacent wires 107 having the small sectional area can be increased. In addition, the clearance between the adjacent wires 107 having the small sectional area is increased effectively by surely interposing the wires 107 having the small sectional area between the wires 108 having the large sectional area, whereby the proximity action can be reduced. Moreover, a higher effect is obtained using a configuration wherein the wires 107 having the small sectional area do not come close to one another and the wires 108 having the large sectional area do not come close to one another, but they are distributed uniformly.

Several stranded wires 106 obtained in this way are subjected to first-stage twisting to form an upper-level stranded wire. Then, several upper-level stranded wires are subjected to second-stage twisting as necessary to form a further upper-level stranded wire (referred to as a high-order stranded wire)(not shown). In this way, a multi-twisted structure wherein the upper-level stranded wires are twisted multiple times is obtained, and on its surface, the second insulating material is formed as shown in FIG. 1 to FIG. 3 to form a coil wire, and then this coil wire is wound to form the heating coil portion 61, whereby the increase in the high-frequency resistance of the coil portion 61 owing to the proximity action at the time when a high-frequency current of 40 to 100 kHz is passed through is suppressed. As a result, the self-heating of the coil portion 61 is reduced, and an induction heating coil having high heating efficiency can be obtained. In the case that the total sectional area of a stranded wire comprising only wires of 0.05 mm in diameter is made identical to that of a stranded wire comprising only wires of 0.1 mm in diameter, the high-frequency resistance of the stranded wire comprising the wires of 0.05 mm in diameter becomes smaller. Hence, in a stranded wire wherein the wires of 0.05 mm in diameter and the wires of 0.1 mm in diameter are mixed, a high-frequency current mainly flows in the wires of 0.05 mm in diameter but rarely flows in the wires of 0.1 mm in diameter. By the interposition of the wire of 0.1 mm in diameter between the wires of 0.05 mm in diameter, the space between the wire of 0.05 mm in diameter and the wire of 0.05 mm in diameter is widened, whereby the increase in the high-frequency resistance of the induction heating coil owing to the proximity action can be prevented.

Figure 7:
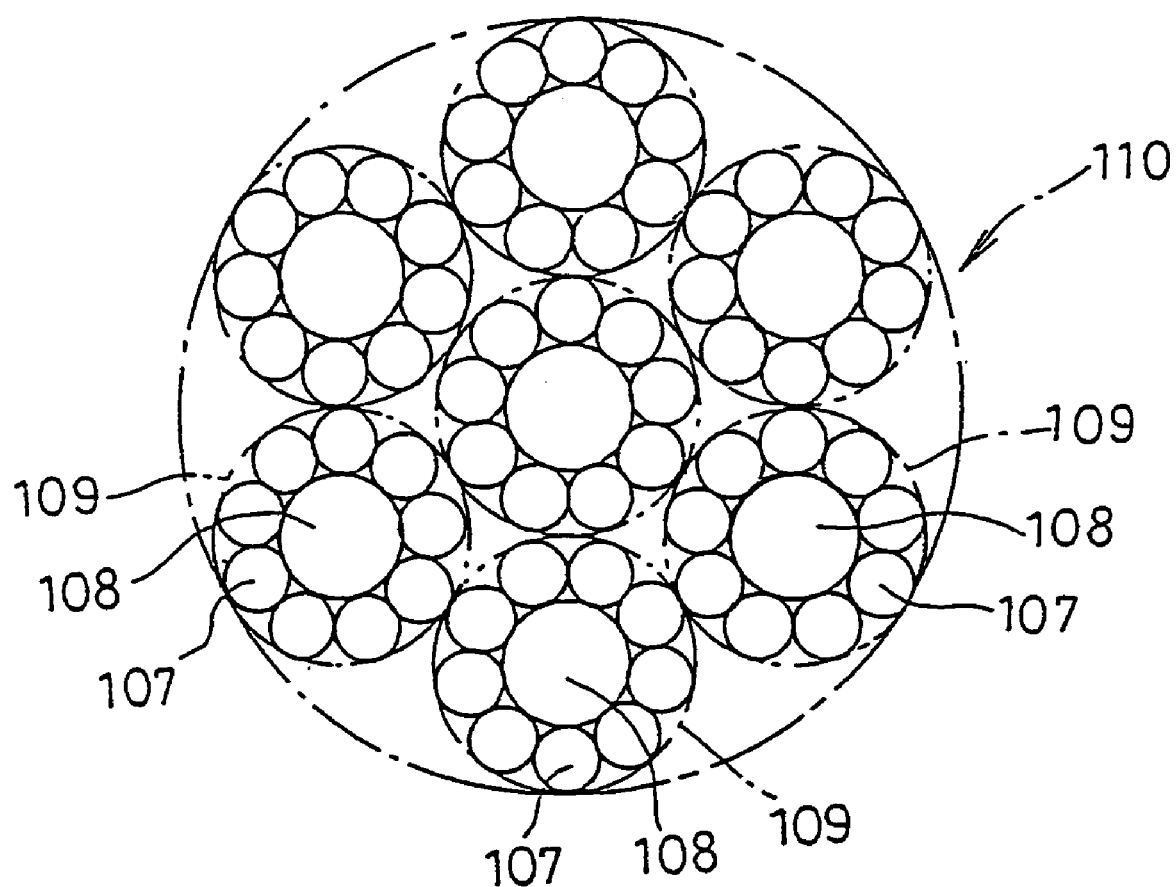
FIG. 7 is a cross-sectional view showing another example of a stranded wire for the induction heating coil in accordance with the second embodiment of the present invention.

FIG. 7 is a cross-sectional view showing another example of a stranded wire constituting the induction heating coil in accordance with this embodiment. In the figure, the wires 107 having the small sectional area are disposed so as to enclose the circumference of the wire 108 having the large sectional area. For example, nine wires of 0.05 mm in diameter are disposed around the circumference of a wire of 0.1 mm in diameter, and these wires are twisted to form a stranded wire 109. Furthermore, these stranded wires 109 are twisted to form an upper-level stranded wire 110. With this configuration, the clearance between the wires 107 having the small sectional area can be widened, whereby the increase in resistance owing to the proximity action can be suppressed effectively. Multiple upper-level stranded wires 110 may be twisted as necessary to form a further upper-level stranded wire. By the repetition of this step, a coil wire having a multi-twisted structure can be obtained.

FIG. 8 is a cross-sectional view showing an upper-level stranded wire 113 of an induction heating coil in accordance with another example of this embodiment.

In FIG. 8, the wires 107 having the small sectional area are twisted to form a stranded wire 112, and the stranded wires 112 are disposed around the circumference of a stranded wire 111 formed by twisting the wires 108 having the large sectional area. Four wires 108 of 0.1 mm, having the large sectional area, are twisted to form the stranded wire 111, and around the circumference thereof, eight stranded wires 112, each comprising twisted seven wires 107 of 0.05 mm, having the small sectional area, are disposed and twisted to form the upper-level stranded wire 113. With this configuration, the clearance between the wires 107 having the small sectional area can be widened, whereby the increase in high-frequency resistance owing to the proximity action can be suppressed stably.

In this second embodiment, the wires 107 having the small sectional area are disposed around the circumferences of the wires 108 having the large sectional area as shown in FIG. 7 and FIG. 8; however, conversely, the wires 108 having the large sectional area may be disposed around the circumferences of the wires 107 having the small sectional area. The wires having the small sectional area and the wires having the large sectional area should only be mixed and disposed in a well-balanced manner.

Embodiment 3

An induction heating coil in accordance with a third embodiment of the present invention will be described referring to FIG. 9 to FIG. 12. This embodiment relates to a coil wire having a multi-twisted structure obtained by multi-stage twisting, wherein a step of twisting thin wires to form a stranded wire and then further twisting a multiplicity of the stranded wires is carried out multiple times as necessary. In particular, an insulating material is disposed at least in part of the coil wire or stranded wires to increase the effective distance between the wires, whereby the increase in resistance owing to the proximity action is suppressed.

Figure 9:
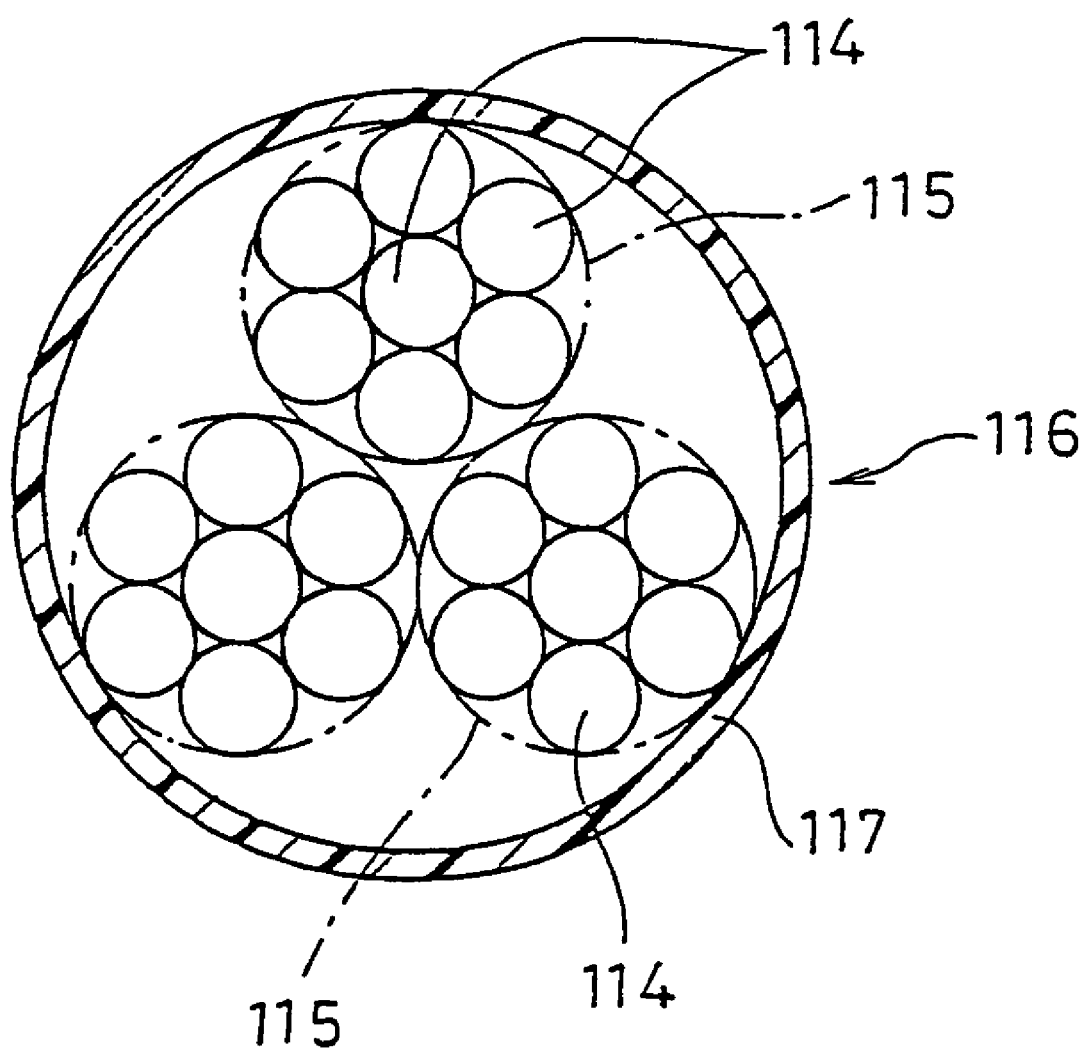
FIG. 9 is a cross-sectional view of a coil wire for an induction heating coil in accordance with a third embodiment of the present invention.

FIG. 9 is a cross-sectional view of a coil wire 116 for induction heating in accordance with the third embodiment of the present invention. In the figure, a thin wire, for example, a conductor of 0.05 mm in diameter, is covered with the first insulating material so as to be insulated, 60 wires thus configured are bundled and twisted to form a stranded wire 114, and seven stranded wires 114 thus obtained are twisted to form an upper-level stranded wire 115. Furthermore, three upper-level stranded wires 115 thus obtained are twisted, and the outer circumferences thereof are covered with a second insulating material 117 to form a coil wire 116 having a multi-twisted structure. Before being covered with the second insulating material 117, this coil wire 116 is heated, and the volatile components included in the coil wire 116 itself are volatilized. Then at least part of the outer circumference of the coil wire 116 is provided with the second insulating material 117. When the coil portion 61 is produced by winding this coil wire 116, the second insulating material is present at least in part between the mutually adjacent portions of the coil wire 116. Hence, the clearance between the adjacent portions of the coil wire 116 becomes larger, and the clearance between the wires becomes larger eventually, whereby the increase in high-frequency resistance owing to the proximity action can be suppressed. When a configuration wherein the whole of the coil wire 116 is provided with the second insulating material 117 is used, the insulation intensity of the whole between the adjacent portions of the coil wire 116 increases when wound, whereby the reliability can be improved. Since the voltage difference between the adjacent portions of the coil wire 116 at the time when a high-frequency current is passed through the induction heating coil to heat a pan or the like made of copper or aluminum is considerably large, this configuration of providing the second insulating material 117 between the portions has high insulation reliability. In the case that the diameter of the wire is approximately 0.05 mm, it is difficult to make the insulation layer for the wire itself thick in production, and the cost increases. Hence, the configuration of this embodiment is excellent in ensuring insulation reliability and attaining cost reduction in the case that wires having a small diameter (wire diameter) (0.1 mm or less) are used for the coil in particular.

Figure 10:
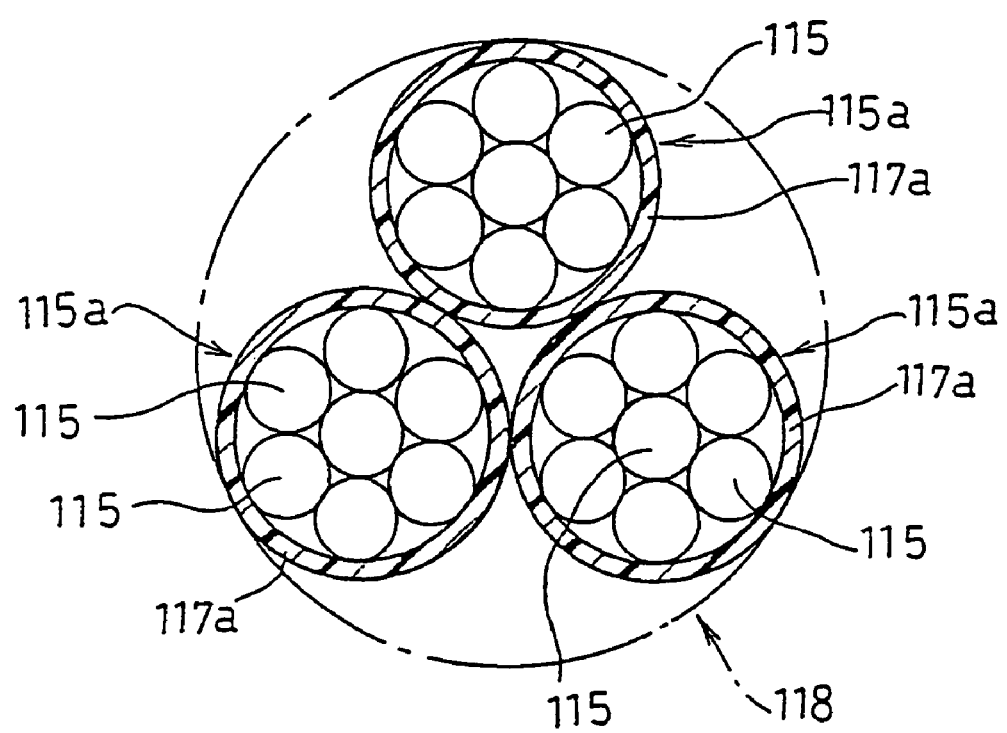
FIG. 10 is a cross-sectional view showing another example of a coil wire for the induction heating coil in accordance with the third embodiment of the present invention.

FIG. 10 is a cross-sectional view showing an induction heating coil wire in accordance with this embodiment. The upper-level stranded wire 115 shown in FIG. 10 is the same as the upper-level stranded wire 115 shown in FIG. 9. In FIG. 10, seven upper-level stranded wires 115 are covered with a second insulating material 117a. Before the upper-level stranded wires 115 are covered with the second insulating material 117a, the upper-level stranded wires 115 are heated, and the volatile components included in the upper-level stranded wires 115 themselves are volatilized, and then at least part of the outer circumferences of the upper-level stranded wires 115 is covered with the second insulating material 117a. Three upper-level stranded wires 115a covered with the second insulating material 117a are bundled and twisted to form a coil wire 118. In this configuration, the second insulating material 117a is present at least in part between the upper-level stranded wires 115a; hence, the clearance between the respective upper-level stranded wires 115a becomes larger. The clearance between the wires of the respective upper-level stranded wires 115a becomes larger eventually, whereby the increase in resistance owing to the proximity action can be suppressed. Furthermore, in the case that the upper-level stranded wires 115 are configured so as to be wholly covered with the second insulating material and used to form the coil Wire 118, the second insulating material is present between the adjacent portions of the coil wire 118 when wound, whereby the insulation intensity of the whole increases and the reliability can be improved.

Figure 11:
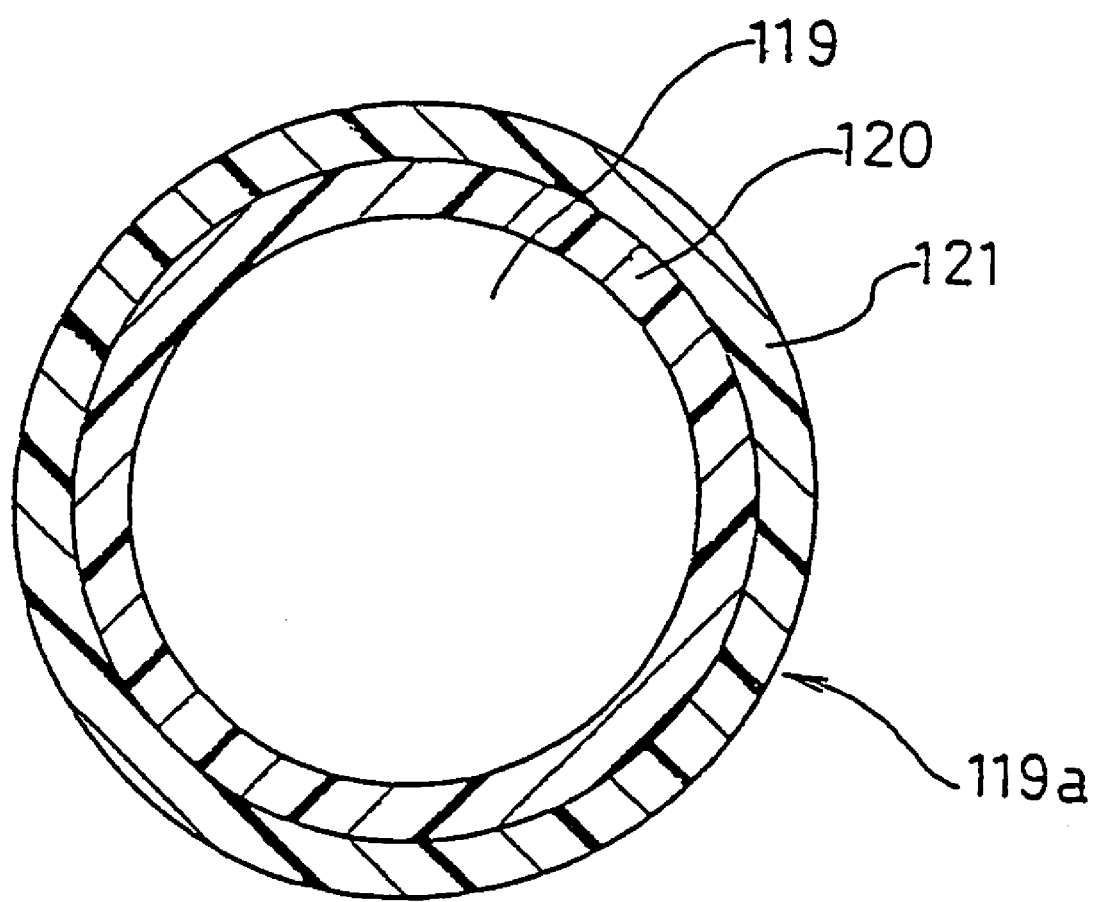
FIG. 11 is a cross-sectional view of a wire constituting a stranded wire.

As a method for cost reduction by omitting a resin immersing step, a method of using a self-bonding wire shown in FIG. 11 is carried out generally. The self-bonding wire is a wire being configured such that the circumference of a conductor 119, such as a copper wire, is provided with an insulation layer 120, and the outside thereof is further provided with a bonding layer 121. Multiple wires 119a obtained in this way are twisted to form a coil wire, and the coil wire is wound to produce a coil portion. After the winding, the coil portion is heated, whereby the bonding layer 121 is fused and solidified. Hence, secure bonding is carried out among the respective wires 119a, and the shape of the coil portion is maintained stably.

The outer circumference of the coil wire 116 shown in FIG. 9 in accordance with this embodiment and the outer circumference of the upper-level stranded wire 115a shown in FIG. 10 are provided with the second insulating materials 117 and 117a, respectively. Therefore, the shape of the coil portion can be maintained stably using these second insulating materials 117 and 117a without using the bonding layer 121 being used for the wire 119a shown in FIG. 11. This configuration is the same as that described in the first embodiment.

Figure 12:
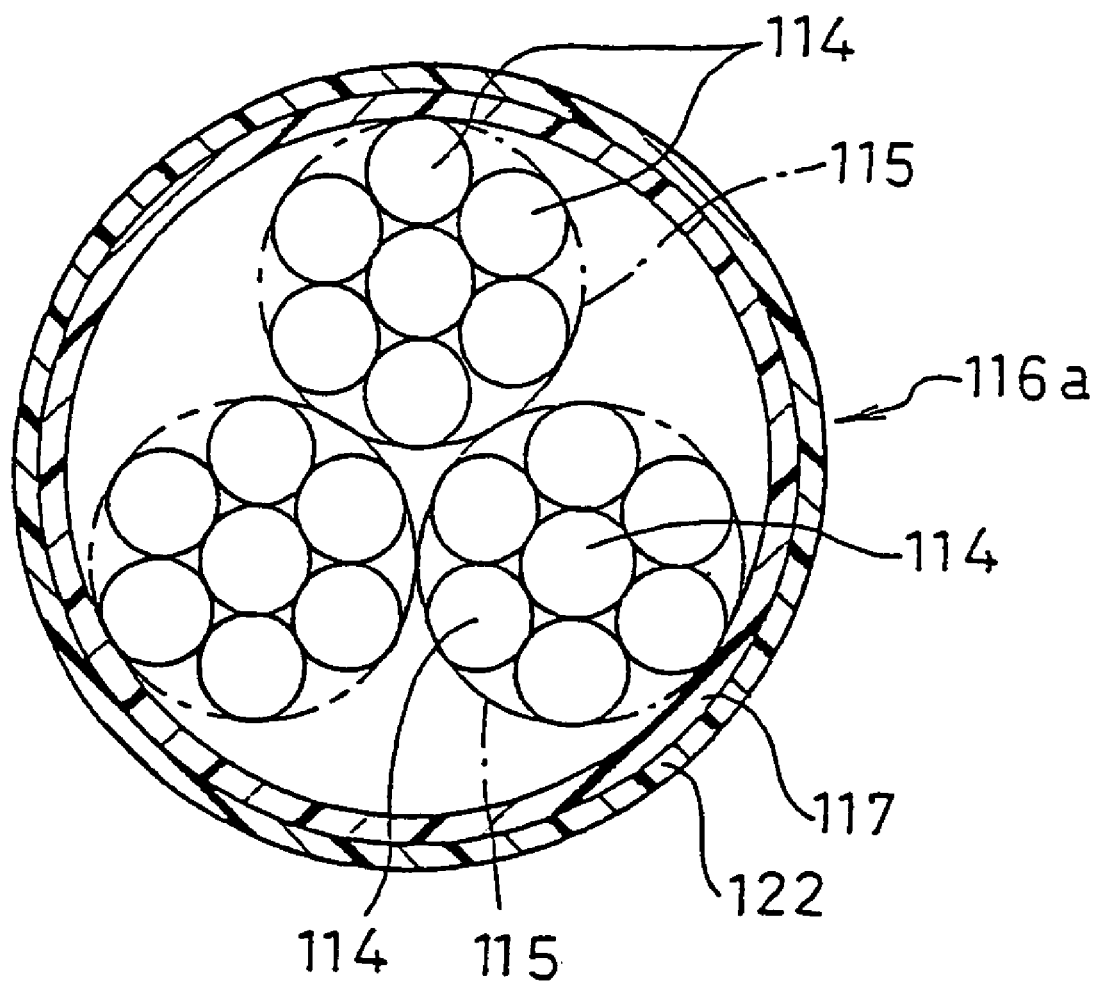
FIG. 12 is a cross-sectional view showing another example of a coil wire for the induction heating coil in accordance with the third embodiment of the present invention.

An example wherein the outer circumference of the coil wire 116 shown in FIG. 9 is provided with an adhesion layer will be described using FIG. 12. The coil wire 116 shown in FIG. 9 is heated in advance, and the volatile components included in the coil wire 116 itself are volatilized and reduced, and then the outer circumference of the coil wire 116 is provided with an adhesion layer 122 to form a coil wire 116a as shown in FIG. 12. The adhesion layer 122 may be a bonding layer that is fused by heating and bonded to the other adjacent portion of the coil wire 116a. When the coil portion obtained by winding the coil wire 116a having this configuration is heated, a portion of the coil wire 116a and another portion of the coil wire 116a adjacent to each other are securely bonded, whereby a coil portion having a stable shape can be obtained.

Heat-shrinkable tape may also be used to maintain the coil portion in a predetermined shape. More specifically, the upper-level stranded wire 115 shown in FIG. 9 or a coil wire (not shown) obtained by twisting a multiplicity of the upper-level stranded wires are wound with heat-shrinkable tape and then heated. Hence, the heat-shrinkable tape shrinks and squeezes the upper-level stranded wire 115 or the above-mentioned coil wire, whereby the coil portion can have a predetermined stable shape.

With the above-mentioned configuration, the shape of the coil portion can be made stable without using the bonding layer for the wire shown in FIG. 11. However, if the bonding layer is not used, the clearance between the wires becomes small, and the increase in resistance owing to the proximity action may cause a problem. In this case, the thickness of the second insulating material should only be increased by the amount corresponding to the bonding layer. With this configuration, the wire production processing is simplified, whereby cost reduction can be attained.

The heat resistance of the insulating material should only be selected from among heat resistance classes required according to design.

As described above, with this embodiment, the increase in high-frequency resistance owing to the proximity action can be suppressed, and insulation performance can be improved and reliability can be raised. Furthermore, with the insulation configuration having adhesiveness, the stability in the shape of the coil portion can be attained. Still further, the volatile components included in the coil wire or the upper-level stranded wire are volatilized and reduced by heating, and then the outer circumference of the coil wire or the upper-level stranded wires is provided with the second insulating material. Hence, when the coil portion is heated during use or when the coil portion is heated at the time of adhesion between the portions of the second insulating material, the volatile components generated from the inside of the coil portion do not accumulate between the upper-level stranded wire and the second insulating material or between the coil wire and the second insulating material. In other words, inconveniences, such as deformation of the coil portion by the volatile components, can be prevented.

As described in the second embodiment and the third embodiment, for suppression of the increase in high-frequency resistance owing to the proximity action, increasing the thickness of the first insulating material for insulating the wire or providing the upper-level stranded wire or the coil wire with the second insulating material is effective. Hence, the influence of the proximity action in the whole of the coil portion was examined by carrying out various experiments, for example, by changing the thickness of the first insulating material for the wire or by changing the thickness and amount of the second insulating material. As a result, in the case that coil portions are formed by winding the coil wires 116 and 118 obtained by forming the second insulating materials 117 and 117a on the outer circumferences, respectively, when a configuration wherein the total sectional area of the conductors of the wires 114 with respect to the sectional area of the whole space occupying as the coil portion is not more than 50% is used, the increase in high-frequency resistance owing to the proximity action can be suppressed properly. If the ratio is more than 50%, a result wherein high-frequency resistance owing to the proximity action increases significantly is obtained. An effect wherein design in consideration of the proximity action is facilitated by adjusting this ratio is thus obtained. Furthermore, the effects of the first and second embodiments are particularly effective in the case that an object to be heated, such as a copper pan or an aluminum pan, is induction heated using a high-frequency current of 40 to 100 kHz.

In this embodiment, an induction heating cooking apparatus serving as an example of an induction heating apparatus is described; however, similar effects are also obtained in other various induction heating apparatuses.

As described above, with the present invention, an induction heating coil having decreased coil resistance for a high-frequency current is obtained by reducing the influences of the skin effect and the proximity action.

Embodiment 4

An induction heating coil in accordance with a fourth embodiment of the present invention will be described referring to FIG. 13 to FIG. 16. The fourth embodiment is characterized in that right stranded wires and left stranded wires are formed when multiple wires or multiple stranded wires are used to produce a stranded wire. A "right stranded wire" is a stranded wire obtained by twisting a bundle of multiple wires (or stranded wires) clockwise. Furthermore, a "left stranded wire" is a stranded wire obtained by counterclockwise twisting. When a stranded wire is formed by twisting right stranded wires and left stranded wires and when its circumference is provided with the second insulating material, it is configured so that the right stranded wires and the left stranded wires are mixed randomly.

Part (a) of FIG. 13 is a cross-sectional view of a stranded wire 209 constituting a coil wire in accordance with this embodiment.

The coil wire in accordance with this embodiment is used for an induction heating coil through which a high-frequency current of approximately 40 kHz to approximately 100 kHz suited for induction heating a copper pan or an aluminum pan is passed. As the frequency of the high-frequency current is higher, the current being passed through the induction heating coil is smaller; however, as the frequency is higher, the resistance of the induction heating coil with respect to the high-frequency current increases even though the current value is the same. A frequency of approximately 60 kHz to approximately 80 kHz is best suited as the frequency of the high-frequency current in consideration of the magnitude of the current and the magnitude of the resistance with respect to the high-frequency current. The number and diameter of the wires constituting the coil wire are determined according to design.

The stranded wire constituting the coil wire in accordance with this embodiment has three-stage multi-twisted structure in which copper wires of 0.1 mm in conductor diameter are used (refer to the first embodiment). In part (a) of FIG. 13, multiple wires or multiple stranded wires are bundled and subjected to first-stage twisting to form a right stranded wire 206 and a left stranded wire 207. The right stranded wire 206 is indicated using hatching lines sloping down to the right, and the left stranded wire 207 is indicated using hatching lines sloping down to the left. Next, as an upper-level stranded wire, three right stranded wires 206 and three left stranded wires 207 are disposed alternately around the circumference of one left stranded wire 207 and subjected to second-stage twisting to form an upper-level stranded wire 208. The upper-level stranded wire 208 is formed of seven stranded wires bundled in total, that is, three right stranded wires 206 and four left stranded wires 207.

The number of the stranded wires subjected to the second-stage twisting is not limited to the number shown in FIG. 13, but the number should only be two or more. Furthermore, the ratio of the number of the right stranded wires 206 and the number of the left stranded wires 207 is not limited to the above value, but a configuration including at least one of either type should only be used. For example, it may also be possible to use a configuration wherein one right stranded wire 206 is provided at the center, and six left stranded wires 207 are disposed around the circumference thereof. At part (a) of FIG. 13 in accordance with this embodiment, the right stranded wires 206 and the left stranded wires 207 are disposed alternately around the circumference of the stranded wire 207 disposed at the center; however, a random arrangement configuration may also be used without being limited to this configuration. However, by the alternate arrangement, the directions of currents flowing through the respective wires are unlikely to become uniform and the effect of reducing the proximity action becomes significant as described later. When the upper-level stranded wire 208 is produced, it may also be possible to use a method wherein two or more stranded wires 206 or 207 are used as one group, such groups are twisted to form right stranded wires and left stranded wires, and these are bundled.

Next, five upper-level stranded wires 208 are bundled and subjected to third-stage twisting to form a stranded wire. At this time, the upper-level stranded wires 208 may be bundled simply. It may also be possible that some of the upper-level stranded wires 208 are twisted clockwise and the remaining upper-level stranded wires 208 are twisted counterclockwise, and both are bundled. The number of the wires to be bundled is determined according to design as described above. The stranded wire 209 obtained as the result of the third-stage twisting is provided on its circumference with a second insulating material, such as described in the first or third embodiment, and used as the coil wire of the coil portion 61 shown in FIG. 4. It may also be possible that a stranded wire subjected to multi-stage twisting, that is, third-stage twisting or more, is produced and used to form the coil wire of the coil portion 61. When a high-frequency current is passed through the stranded wire 209 having the above-mentioned configuration, currents flow spirally through the right stranded wire 206 and the left stranded wire 207 adjacent to each other as indicated by arrows 236 and 237 as shown in the side view at part (b) of FIG. 13. Since the directions of the respective currents flowing through the right stranded wire 206 and the left stranded wire 207 adjacent to each other are different as described above, the increase in resistance owing to the proximity action is reduced. The mutual difference between the directions of currents is herein referred to as "nonuniformity in current direction."

As described above, the right stranded wires and the left stranded wires may be formed in any stage, or after the right stranded wires and the left stranded wires are bundled, the right stranded wires and the left stranded wires may be formed further repeatedly in the next stage and they may be bundled.

In a specific example of this embodiment, since a thin wire of 0.1 mm in diameter is used as a wire, the increase in resistance owing to the skin effect at the time when a high-frequency current is passed through can be prevented. Furthermore, since the right stranded wires and the left stranded wires are bundled to form the coil wire 209, the directions of the currents flowing through the wires of the right stranded wire and the wires of the left stranded wire can be made nonuniform. Hence, the deviation of the current (electric charge) generated in another adjacent stranded wire owing to the proximity action can be reduced and the increase in resistance can be prevented.

FIG. 14 is a cross-sectional view of another example of a stranded wire constituting a coil wire in accordance with this embodiment. In the stranded wire 211 of this example, two right stranded wires 206 and two left stranded wires 207, each formed by subjecting wires to first-stage twisting, that is, four in total, are used and subjected to second-stage twisting to form an upper-level stranded wire 210. For a more significant effect, the right stranded wires 206 and the left stranded wires 207 are disposed alternately. With this configuration, the directions of the currents flowing through the adjacent stranded wires 206 and 207 become nonuniform, whereby the influence of the proximity action can be reduced. Furthermore, seven upper-level stranded wires 210 are bundled and subjected to third-stage twisting to form the stranded wire 211. The circumference of the stranded wire 211 is provided with the second insulating material to form a coil wire, and this coil wire is wound to form the coil portion 61 shown in FIG. 4. In this example, the influence of the proximity action is reduced, whereby the induction heating efficiency of the coil portion 61 can be raised further.

Bundling the right stranded wires 206 and the left stranded wires 207, equal in number, may be carried out in any stage of twisting; however, it is effective that the bundling should be carried out in the initial stage, that is, the first stage, to the extent possible, since the portions wherein the flows of currents are nonuniform are distributed uniformly as a whole.

In addition, when the second-stage twisting is carried out, one right stranded wire 206 and one left stranded wire 207 are twisted in advance to form a basic stranded wire 212 as shown in FIG. 15. It may also be possible that a multiplicity of these basic stranded wires 212 are used and bundled while being twisted so that the second-stage twisting is carried out as shown in FIG. 16, thereby to form a coil conductive wire 213 serving as an upper-level stranded wire. With this configuration, the directions of the currents flowing through the adjacent stranded wires become nonuniform, whereby the influence of the proximity action can be reduced, as described referring to FIG. 14.

Bundling the right stranded wire 206 and the left stranded wire 207 to form the basic stranded wire 212 may be carried out in any stage of twisting; however, it is effective that the bundling should be carried out in the initial stage, that is, the first stage, to the extent possible, since the portions wherein the flows of currents are nonuniform are distributed uniformly as a whole.

Embodiment 5

A coil wire for use in an induction heating coil in accordance with a fifth embodiment of the present invention will be described using parts (a) and (b) of FIG. 17. This embodiment is characterized in that when multiple wires or multiple stranded wires are twisted to form a stranded wire, two or more kinds of wires, different in twisting pitch, are prepared. A multi-twisted structure wherein multiple stranded wires, different in twisting pitch, are twisted to form an upper-level stranded wire is used. The twisting pitch is the distance from one twisted portion to the next portion twisted in the same state.

Part (b) of FIG. 17 is a side view showing wires or stranded wires bundled and twisted at three kinds of twisting pitches by first-stage twisting. The smallest twisting pitch is 25 mm, for example, and the stranded wire having this pitch is referred to as a stranded wire 214. The largest twisting pitch is 35 mm, for example, and the stranded wire having this pitch is referred to as a stranded wire 216. An intermediate twisting pitch is 30 mm, for example, and the stranded wire having this pitch is referred to as a stranded wire 215. These three kinds of stranded wires 214, 215 and 216 are bundled and subjected to second-stage twisting to produce a stranded wire 217 shown in the cross-sectional view of part (a) of FIG. 17. In part (a) of FIG. 17, the stranded wire 217 is obtained by bundling the stranded wire 214 indicated using vertical hatching lines, the stranded wire 215 indicated using horizontal hatching lines and the stranded wire 216 indicated using oblique hatching lines. Furthermore, three stranded wires 217 are used and subjected to third-stage twisting to produce a stranded wire 218. In the stranded wires 214, 215 and 216 being mutually different in twisting pitch as described above, they are mutually different in the extent of wire twisting, and the wire inclination directions with respect to the longitudinal directions of the stranded wires 214, 215 and 216 are different. Hence, when multiple stranded wires being mutually different in twisting pitch are bundled, their current flowing directions are mutually different. Therefore, the current directions become mutually nonuniform, whereby the influence of the proximity action can be reduced.

When stranded wires having mutually different twisting pitches are bundled, it is desirable that the ratios among the twisting pitches should not be integral multiples of one another. If stranded wires twisted such that their twisting pitches are integral multiples are bundled, the nodes of the stranded wires are aligned and the same state is repeated, whereby the portions wherein the current directions are nonuniform are reduced as a whole.

In the embodiment described above, the case wherein three kinds of stranded wires, that is, the stranded wires 214, 215 and 216 being different in twisting pitch, are used is described; however, without being limited to this, two kinds may also be used, or more kinds may also be used.

Bundling of stranded wires being different in twisting pitch may be carried out in any stage of twisting. A coil wire configuration wherein current directions are nonuniform as far as possible should be attained using stranded wires being different in twisting pitch.

A stranded wire may also be produced by combining the fourth embodiment with the fifth embodiment as a matter of course.

In this embodiment, a stranded wire obtained by three-stage multi-twisting is described as the stranded wire 218; however, without being limited to this, two or more stages may also be carried out as a matter of course.

Embodiment 6

A sixth embodiment in accordance with the present invention relates to an induction heating coil 203 shown in the top view of FIG. 18. In this embodiment, the stranded wire 218 in accordance with the above-mentioned fifth embodiment shown in FIG. 17 and covered with the second insulating material is used as a coil wire 219. The coil wire 219 is spirally wound on a coil holding member 250 to form an induction heating coil 203 as shown in FIG. 18. Since the coil wire 219 is obtained by bundling the stranded wires 214, 215 and 216 being mutually different in twisting pitch, the respective portions of the coil wire 219, that is, the coil wire portions adjacent to the nth coil wire portion n of the induction heating coil 203, that is, the (n−1)the coil wire portion (n−1) and the (n+1)the coil wire portion (n+1), are formed of the stranded wires 214, 215 and 216 being mutually different in twisting pitch as shown in part (a) of FIG. 17, whereby the directions of the wires constituting the stranded wires 214, 215 and 216 at the adjacent portions are rarely the same. Since the directions of the wires are not the same, the directions of currents flowing through the wires are not the same but become nonuniform. Since the current directions are nonuniform, the proximity action is reduced, whereby the increase in the resistance of the induction heating coil 203 owing to the proximity action can be avoided.

Embodiment 7

A stranded wire for an induction heating coil in accordance with a seventh embodiment of the present invention will be described referring to FIG. 19 to FIG. 23. FIG. 19 is a side view of a stranded wire 220 constituting a coil wire in accordance with this embodiment, that is, the seventh embodiment, and FIG. 20 is a cross-sectional view taken on XX—XX of FIG. 19. The stranded wire 220 is configured by combining wires, or stranded wires 221 and 222, each formed by bundling multiple wires, as described below. First, multiple stranded wires 221 are formed into a right spiral shape so that a tube-shaped right spiral portion 221*a* is formed, the cross section of which is shown in FIG. 20. Next, multiple stranded wires 222 are formed into a left spiral shape so that a tube-shaped left spiral portion 222*a* is formed, the diameter of which is larger than the diameter of the above-mentioned right spiral portion 221*a*, outside the right spiral portion 221*a* as shown in FIG. 20. FIG. 19 is a view seen from the side of the tube-shaped stranded wire 220; however, only the stranded wires 221 and 222 disposed on the front side of the tube-shaped stranded wire 220 are shown, but the stranded wires 221 and 222 disposed on the rear side are not shown so that the figure can be understood easily.

In the stranded wire 220 in accordance with this embodiment, at each intersection portion 229 wherein the stranded wires 221 and 222 come close to each other, the directions of the respective currents flowing through the stranded wires 221 and 222 are different from each other, whereby the influence of the proximity action between the mutual wires thereof can be reduced.

When an object to be heated, such as a pan, is induction heated by passing an alternating current through an induction heating coil formed by winding the coil wire comprising the stranded wire 220 in accordance with this embodiment, an eddy current is generated in the object to be heated in a direction opposed to that of the current in the heating coil. By the proximity action of this eddy current, the current flowing through the coil portion is attracted to the object to be heated, whereby the current does not flow uniformly through the stranded wire 220, but flows so as to be deflected to one side. In this embodiment, the right spiral portion 221a being right-spiraled is made close to the left spiral portion 222a being left-spiraled, whereby the distance between the object to be heated and the right spiral portion 221a becomes almost equal to the distance between the object to be heated and the left spiral portion 222a, and the difference between the current flowing through the stranded wire 221 and the current flowing through the stranded wire 222 is reduced. In addition, the imbalance in the current density inside the wires thereof owing to the proximity action between the stranded wires 221 and 222 is eliminated, and the loss in the coil portion is reduced.

In the embodiment described above, the configuration wherein the stranded wires 221 being right-spiraled are provided inside the stranded wires 222 being left-spiraled is shown; however, the same effect is obtained even if the stranded wires 222 are provided inside the stranded wires 221.

FIG. 21 is a side view of a stranded wire 223 in accordance with another example of the seventh embodiment. The stranded wire 223 having the configuration shown in FIG. 21 is formed into a tube shape by weaving the stranded wires 221 and 222. Only the stranded wires 221 and 222 disposed on the front side of the tube-shaped stranded wire 223 are shown, but the stranded wires 221 and 222 disposed on the rear side are not shown so that the figure can be understood easily.

In the stranded wire 223 having the configuration shown in FIG. 21, the directions of the respective currents flowing through the stranded wire 221 and the stranded wire 222 are different at each intersection portion thereof, whereby the influence of the proximity action can be reduced. Furthermore, as in the stranded wire 220 shown in FIG. 19, when an object to be heated, such as a pan, is induction heated, an eddy current is generated in the object to be heated in a direction opposed to that of the current in the heating coil. By the proximity action of this eddy current, the current flowing through the coil portion is attracted to the object to be heated, whereby the current does not flow uniformly through the stranded wire 223, but flows so as to be deflected to one side. In this embodiment, the stranded wires 221 being right-spiraled and the stranded wires (sic) being left-spiraled are woven so as to be made close to each other, whereby the distance between the object to be heated and the stranded wires 221 becomes almost equal to the distance between the object to be heated and the stranded wires 222, and the difference between the current flowing through the stranded wire 221 and the current flowing through the stranded wire 222 is reduced. In addition, the imbalance in the current density inside the wires thereof owing to the proximity action between the stranded wires 221 and 222 is eliminated, and the loss in the coil portion is reduced.

FIG. 22 is a side view of a coil conductive wire 224 in accordance with another example of the seventh embodiment. The stranded wire 224 shown in FIG. 22 is obtained by replacing the inside/outside disposition of the stranded wires 221 and 222 of the stranded wire 220 shown in the above-mentioned FIG. 19 in the vicinity of line L. In other words, in the range from lower end B of the stranded wires 222 to line L in FIG. 22, the stranded wires 221 are disposed inside the stranded wire 222. In the range from line L to upper end T, the stranded wires 221 are disposed outside the stranded wires 222. In this way, the inside/outside positional relationship of the stranded wires 221 and 222 is replaced at every predetermined distance. Processing at the step of replacing the inside/outside positions of the stranded wires 221 and 222 is facilitated by providing straight portions 225 having a constant length in the vicinity of line L at which the inside/outside positional relationship is replaced. The effect of the stranded wire 224 configured as shown in FIG. 22 is almost the same as that of the stranded wire 220 configured as shown in the above-mentioned FIG. 19. The processing for the stranded wire 224 is easier than that for the stranded wire 223 configured as shown in the above-mentioned FIG. 21, whereby productivity is excellent and production cost is reduced.

FIG. 23 is a cross-sectional view of an induction heating coil 226 formed by winding a coil wire obtained by covering the circumference of the stranded wire 220, 223 or 224 in accordance with the respective examples of the seventh embodiment with the second insulating material. A coil holding member 250, the cross section of which is shown, is a member having the shape of a nearly circular disc, and a coil portion 230 wherein a coil wire formed of the stranded wire 220, for example, is wound spirally as shown in FIG. 18 is installed on the coil holding member 250. The tube-shaped coil wire 220 shown in FIG. 19, being crushed and flattened, is used for the coil portion 230. By virtue of the flattened shape, it is possible to increase the number of turns of the coil portion 230 capable of being wound on the coil holding member 250 having a predetermined diameter and the shape of the nearly circular disc. Since the number of turns of the coil portion 230 can be increased, the length of the coil wire formed of the stranded wire 220 and to be wound increases. Hence, the coil portion 230 is suited for induction heating apparatuses for applications requiring an induction heating coil formed by winding a long coil wire many turns. In this induction heating coil 226, the stranded wire 220 shown in FIG. 19 and constituting the coil portion 230 comprises the stranded wires 221 being right-spiraled and the stranded wires 222 being left-spiraled. Hence, the directions of the currents respectively flowing through the stranded wires 221 and 222 are different. Therefore, the proximity action between the stranded wires 221 and 222 is reduced, and the imbalance between the currents respectively flowing through the stranded wires 221 and 222 is reduced, whereby the increase in resistance owing to the imbalance between the currents can be avoided. As a result, the thermal efficiency of the induction heating coil during use can be improved.

In the above-mentioned embodiment of the present invention, a copper wire of 0.1 mm in conductor wire diameter (diameter) was used for the wires of the induction heating coil; however, the above-mentioned action does not vary significantly with the wire diameter; even if a thin copper wire of 0.04 mm to 0.06 mm in wire diameter is used, for example, a similar effect is obtained.

As described above, with the present invention, the influences of the skin effect and the proximity action are reduced; hence, the resistance of the induction heating coil with respect to a high-frequency current is reduced and power loss is reduced, whereby the efficiency of induction heating can be improved.

Embodiment 8

An induction heating coil in accordance with an eighth embodiment of the present invention will be described referring to FIG. 24 to FIG. 30. The induction heating coil in accordance with the eighth embodiment has a configuration wherein the coil wire for the induction heating coils described in the first embodiment to the sixth embodiment described above is wound spirally to form a coil portion, and this coil portion is installed on the coil holding member 60 as shown in FIG. 4. In FIG. 4, the coil lead portions 63 and 83 serving as the ends of the coil portion 61 are led to the outside.

FIG. 26 is a partially perspective view of the coil holding member 60, and shows the detailed configuration of a terminal securing portion 62 on which the coil lead portions 63 and 83 are installed. The terminal securing portion 62 is made of the same heat-resistant resin as that of the coil holding member 60 and may be formed so as to be integrated with the coil holding member 60. The coil lead portions 63 and 83 at both end portions of the coil portion 61 are connected to the terminal portions 65 and 85, respectively, and the terminal portions 65 and 85 are secured to the terminal securing portion 62.

The connection of the terminal portion 85 to the coil lead portion 83, shown in FIG. 4, of the coil wire 30, for example, will be described referring to FIG. 24 to FIG. 30. Part (a) of FIG. 24 is a perspective view of the terminal portion 85. Part (b) of FIG. 24 is a cross-sectional view showing a female thread portion 87 having a protruding portion 99 formed on the terminal portion 85. The terminal portion 85 is formed of a metal plate made of an electrically good conductor, such as brass, and having a thickness of approximately 0.8 mm. In the figure, the right end portion of the terminal portion 85 is provided with a connection portion 2 formed by bending part of the terminal portion 85 so as to be formed into a circular shape. The inside diameter of the circular-shaped portion of the connection portion 2 is made slightly larger than the outside diameter of the coil lead portion 83. A coil lead end portion 84 measuring 5 to 10 mm at the leading end portion of the coil lead portion 83 is inserted into the circular-shaped portion of the connection portion 2 and connected using the connection apparatus 20 shown in FIG. 27.

The connection apparatus 20 has a pressure drive mechanism 21, such as an air cylinder, and the upper electrode 22 thereof is moved in the direction indicated by arrow 24, whereby a predetermined pressure can be applied to a workpiece placed between the upper electrode 22 and the stationary lower electrode 23. Part (a) of FIG. 28 is a perspective view showing the shape of the upper electrode 22, and part (b) of FIG. 28 is a perspective view showing the shape of the lower electrode 23. The upper electrode 22 made of copper has a protruding portion 22a on its lower face. The lower electrode 23 also made of copper has a protruding portion 23a on its upper face.

The connection portion 2 of the terminal portion 85 shown in part (a) of FIG. 24 is placed between the upper electrode 22 and the lower electrode 23 as shown in FIG. 29. Next, the upper electrode 22 is moved in the direction indicated by arrow 24 to apply pressure as shown in FIG. 30. Simultaneously with the start of the pressure application, an alternating current or a direct current is passed through between the upper electrode 22 and the lower electrode 23. The current flows from the upper electrode 22 to the lower electrode 23 via the connection portion 2. This current generates Joule heat in the connection portion 2. The heat generated in the connection portion 2 is transferred to the coil lead end portion 84, whereby the second insulating material 31, 41 or 51 and all the wires 25 (FIGS. 1 to 3) are heated. When the temperatures of the second insulating material 31 and the wires 25 are raised, the second insulating material 31 and the first insulating material covering the conductor of each wire 25 are fused and liquefied. Since the upper electrode 22 continues pressure application in this state, the resin serving as the fused second insulating material 31, 41 or 51 and the resin serving as the fused first insulating material covering each wire 25 are pushed out from the region being held between the upper electrode 22 and the lower electrode 23, whereby a fused material 83a accumulates near the end face of the connection portion 2 as shown in FIG. 25. As a result, the conductors of the wires 25 are exposed and make contact with one another. At the same time, some of the conductors also make contact with the connection portion 2. Hence, at the coil lead portion 83, the conductors of the wires 25 are electrically connected to the terminal portion 85 directly or via other conductors. The pressure application force of the upper electrode 22 in the connection apparatus 20 is preferably approximately 2000 N (N: Newton) or more, and the current is preferably a direct current of 3500 A. Furthermore, the application time of the current is 1 to 3 seconds. The shape of the connection portion 2 connected by the above-mentioned method is shown in FIG. 25, and a concave pressure-bonded portion 86 is formed by pressure application using the protruding portion 22a of the upper electrode 22.

When the metallic connection portion 2 being held between the upper electrode 22 and the lower electrode 23 of the connection apparatus 20 is energized while being pressurized, the protruding portions 22a and 23a of the respective electrodes make contact with the connection portion 2 as shown in FIG. 30. Hence, the contact area of the connection portion 2 making contact with the upper electrode 22 and the lower electrode 23 has a predetermined value determined by the areas of the protruding portions 22a and 23a. Since the contact area has the predetermined value, the heating value at the time when a constant current (3500 A) is passed through becomes almost constant in design, whereby stable connection processing can be carried out between the coil wire 30 and the connection portion 2.

As described above, with this embodiment, multiple wires 25 whose conductors are covered with the first insulating material are bundled and twisted to form a stranded wire, the diameter of the conductor of the wire is made very small, 0.05 mm, and the insulation thickness of each wire is made thin, 100 μm. Hence, even if the number of the wires is increased to 1600, the diameter (outside diameter) of the coil wire can be made small to approximately 3.5 mm.

In addition, in the coil wire 30 shown in FIG. 1, the outer faces of the stranded wires are covered with the second insulating material 31. Furthermore, in the coil wire 50 shown in FIG. 3, the outer faces of the stranded wires are covered with the second insulating materials 41 and 51. Hence, when the coil 61 is formed by winding the coil wire 30 or 50 a predetermined number of turns so as to have a predetermined shape, the second insulating materials 31, 41 and 51 serve as protection films. Hence, partial undoing of twisting or breakage owing to application of nonuniform forces to the wires 25 does not occur during winding operation. Furthermore, the first insulating material is scratch resistant, whereby quality is made stable and winding work is facilitated simultaneously.

In addition, as shown in part (a) of FIG. 24, both the coil lead end portions 64 and 84 of the coil wire 30, formed by covering the stranded wires comprising the thin wires 25 having the covering of the first insulating material to be fused by heat, such as a thermoplastic resin, with the second insulating material 31, such as a thermoplastic resin, are simultaneously heated and pressure-bonded to the respective terminal portions 65 and to carry out connection. Hence, it is not necessary to eliminate the covering resins serving as the second insulating material 31 and the first insulating material for each wire 25 in advance, whereby the connection between the coil wire 30 and the terminal portions 65 and 85 can be carried out very easily in a short time. Since no soldering is necessary, skilled workers are not required. Furthermore, chemical processing for eliminating the covering is not required, whereby the conductive wires are adversely affected by residual chemicals. The connection between the coil lead portion 63 and the terminal portion 65 shown in FIG. 26 is carried out by a step similar to that for the connection between the coil lead portion 83 and the terminal portion 85 described above. In the above description, the connection between the coil wire 30 shown in FIG. 1 and the terminal portions 65 and 85 is described; however, the connections between the coil wires 40 and 50 shown in FIG. 2 and FIG. 3 and the terminal portions 65 and 85 are also carried out similarly.

Next, the installation of the terminal portions 65 and 85 on the terminal securing portion 62 shown in FIG. 26 will be described referring to FIG. 25 and FIG. 26. The terminal portions 65 and 85 have substantially the same configuration, except that they are shaped so as to be symmetrical with respect to center line C when installed on the terminal securing portion 62. In the following description, the terminal portion 65 or the terminal portion 85 is described as necessary so that FIG. 25 and FIG. 26 can be understood easily; however, the description of the terminal portion 65 is also applicable to that of the terminal portion 85, and the description of the terminal portion 85 is also applicable to that of the terminal portion 65. In FIG. 25, the terminal portion 85 has the female thread portion 87 at the central portion and has a cut and raised portion 4 at the left end. The female thread portions 67 and 87 preferably have a cylindrical protruding portion 99 provided with a thread on the inner face thereof as shown in part (b) of FIG. 24. In FIG. 26, the terminal securing portion 62 is provided with pawl portions 89, 90 and 91 so that a clearance slightly larger than the height (thickness) of the female thread portions 67 and 87, including the protruding portion 99, of the terminal portions 65 and 85 is provided between the pawl portions and the upper face 62a of the terminal securing portion 62.

For example, when the terminal portion 65 is installed on the terminal portion 62, the terminal portion 65 is inserted in the direction indicated by arrow 94 shown in the figure into the clearance provided below the above-mentioned pawl portions 89 and 90. When the terminal portion 65 is pushed further in the same direction, it moves ahead while the upper face of the cut and raised portion 4 makes contact with the lower end of the pawl portion 91 and while the cut and raised portion 4 is deformed slightly downward elastically. When the protruding portion 99 of the female thread portion 67 is inserted into a hole (not shown) provided in the upper face 62a of the terminal securing portion 62, the upper face of the cut and raised portion 4 moves downward and does not make contact with the lower end of the pawl portion 91. In this state, the upward movement of the terminal portion 65 is restricted by the cut and raised portion 4 and the pawl portion 91, and its movement in the horizontal direction is restricted by the protruding portion 99 of the female thread portion 87 and the hole in the upper face 62a of the terminal securing portion 62.

Since the terminal portion 65 is secured to the terminal securing portion 62 as described above, no additional components are required to restrict the position of the terminal portion 65. Hence, the cost can be reduced, and the installation work for the terminal portion 65 is facilitated.

As shown in part (a) of FIG. 24, the terminal portion 85 has the connection portion 2 for electrically connecting the coil lead portion 83 of the coil wire 30, 40 or 50 by heating and pressure-bonding, a coil wire holding portion 100 extended to the connection portion 2, and a bending portion 101 extended in a direction nearly perpendicular to that of the coil lead portion 83 that is installed on the coil wire holding portion 100. The female thread portion 87 is formed in the bending portion 101. The coil lead portion 83 is disposed in a direction nearly identical to that of the coil wire holding portion 100.

In FIG. 26, when a wiring connector 120 connected to the outside is connected to the terminal portion 65, a male screw 96 is inserted into the female thread portion 67 and tightened. However, a configuration provided with a simple hole instead of the female thread portion 67 may also be used. In this case, a nut is used instead of the thread of the female thread portion 67, and the male screw 96 is tightened to carry out securing. Furthermore, a self-tapping screw may also be used instead of the male screw 96.

Since the terminal portion 65 is held using the terminal securing portion 62 secured to or integrated with the coil holding member 60 as described above, the lead portions 63 and 83 of the coil 61 can be shortened. The work for connecting an apparatus for supplying a high-frequency current to the coil 61, such as an inverter, is facilitated using the connector 120. Since the coil lead portions 83 is led out in a direction nearly identical to that of the coil wire holding portion 100, the coil lead portion 83 is placed on the coil wire holding portion 100 during assembly or after assembly. Hence, no hanging occurs, whereby it is possible to prevent application of a large bending force to the wires of the coil lead portion 83 near the connection portion 2. The female thread portion 87 is provided in the bending portion 101 extended in a direction nearly perpendicular to that of the coil lead portion 83 that is installed on the coil wire holding portion 100. Hence, when the connector 120 for external wiring is connected to the female thread portion 87 of the terminal portion 85, the coil lead portion 83 does not become obstructive, and wiring work is facilitated. The bending portion 101 is extended in a direction nearly perpendicular to that of the coil wire holding portion 100, that is, in a direction nearly perpendicular to that of the coil lead portion 83; however, without being limited to this, if it is extended so as to be bent nonlinearly, a similar effect is produced.

As described in detail in the above-mentioned embodiments, the present invention can provide an induction heating coil suited for induction heating a highly-conductive nonmagnetic object to be heated having conductivity equivalent to that of aluminum or higher, and configured to significantly suppress heat generated owing to high-frequency loss and to be produced easily at low cost and with stable quality.

INDUSTRIAL APPLICABILITY

The present invention can be used as an induction heating coil through which a high-frequency current is passed to induction heat a material having low resistivity and high magnetic permeability, such as aluminum, in particular, in induction heating apparatuses being used for induction heating cooking apparatuses, copiers, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An induction heating coil for use in an induction heating apparatus for induction heating an object to be heated made of a material such as copper or aluminum by passing a high-frequency current of 40 to 100 kHz, having a coil portion formed of a coil wire serving as a coil conductive wire and comprising stranded wires, each obtained by bundling and twisting multiple wires whose conductors are covered with a first insulating material, being covered on the outer faces thereof with a second insulating material formed of a fluorocarbon resin having insulation layers having different melting points, the melting point of the fluorocarbon resin for use in the outermost insulation layer of said second insulating material being made lower than the melting point of PFA serving as the fluorocarbon resin for use in the inner insulation layer thereof, said coil wire being wound a predetermined number of turns so as to have a predetermined shape and heated to fuse said outermost insulation layer formed of the fluorocarbon resin and to carry out bonding.

2. An induction heating coil in accordance with claim 1, wherein wires of 0.1 mm or less in the diameter of said conductor are used for at least part of said stranded wires.

3. An induction heating coil in accordance with claim 1, comprising terminal portions for external connection secured to the ends of said coil portion while electrical connection to said conductors is maintained by carrying out heat generation using Joule heat generated by current flowing and by pressurizing the ends of said coil portion at the same time to fuse said first insulating material and said second insulating material and to pressure-bond the ends to said conductors.

4. An induction heating coil in accordance with claim 3, further comprising a coil holding member for holding said coil portion and said terminal portions, said terminal portion having a connection portion for electrically connecting said conductors by simultaneously heating and pressurizing the end of said coil portion, a coil wire holding portion extended to said connection portion and a bending portion extended nonlinearly to said coil wire holding portion, said bending portion having a female thread portion or a hole, and said coil wire at the end of said coil portion being lead out from said connection portion in a direction substantially identical to that of said coil wire holding portion.

5. An induction heating coil production method comprising:

a step of forming a coil portion by winding a coil wire a predetermined number of turns so as to have a predetermined shape, said coil wire being formed by covering the outer faces of stranded wires, each obtained by bundling and twisting multiple wires whose conductors of 0.1 mm or less in diameter are covered with a first insulating material, with a second insulating material, and a step of connecting terminals for external connection to the ends of said coil portion while electrical connection to said conductors is maintained by carrying out heat generation using Joule heat generated by current flowing at the connection portions of the terminals for external connection and by pressurizing the ends of said coil portion at said connection portions at the same time to fuse said first insulating material and said second insulating material and to pressure-bond said ends to said conductors, wherein said second insulating material is a fluorocarbon resin having multiple insulation layers having different melting points, the melting point of the fluorocarbon resin for use in the outermost insulation layer of said second insulating material is made lower than the melting point of PFA serving as the fluorocarbon resin for use in the inner insulation layer thereof, and in said step of forming said coil portion, said outermost insulation layer is fused by heating and the adjacent portions of said coil wire are securely bonded mutually.

6. An induction heating coil production method in accordance with claim 5, comprising a step of leading out said coil wire at the end of said coil from said connection portion in a direction substantially identical to that of said coil wire holding portion, said terminal having a connection portion for electrically connecting said conductors by simultaneously heating and pressurizing the end of said coil portion, a coil wire holding portion extended to said connection portion and a bending portion extended nonlinearly to said coil wire holding portion, and said bending portion having a female thread portion or a hole.

7. An induction heating coil having a coil portion formed of a coil wire serving as a coil conductive wire and comprising wires whose conductors are covered with a first insulating material or stranded wires each obtained by bundling and twisting a multiplicity of said wires, the outer circumferences thereof being provided with a second insulating material partly or wholly, and said coil wire being wound a predetermined number of turns so as to have a predetermined shape, and said coil portion being configured that said second insulating material has an adhesion function generated by carrying out predetermined heating and is a bonding insulating material, wherein said second insulating material is a material selected from the group consisting of woven cloth immersed in a non-cured rubber, woven cloth immersed in a half-cured rubber, woven cloth immersed in a thermoplastic resin, nonwoven cloth immersed in a non-cured rubber, nonwoven cloth immersed in a half-cured rubber, and nonwoven cloth immersed in a thermoplastic resin, and that a portion of said second insulating material is bonded to another portion of said second insulating material by heating.

8. An induction heating coil for use in an induction heating apparatus for induction heating an object to be heated made of a material such as copper or aluminum by passing a high-frequency current of 40 to 100 kHz, having a coil portion formed of a coil wire serving as a coil conductive wire and comprising stranded wires, each obtained by bundling and twisting multiple wires whose conductors are covered with a first insulating material, being covered on the outer faces thereof with a second insulating material formed of a fluorocarbon resin having insulation layers having different melting points, the melting point of the outermost insulation layer of said second insulating material being made lower than the melting point of the inner insulation layer thereof, said coil wire being wound a predetermined number of turns so as to have a predetermined shape and heated to fuse said outermost insulation layer made of the fluorocarbon resin and to carry out bonding, wherein before the outer circumferences of said stranded wires are provided with said second insulating material, said stranded wires themselves are heated to reduce volatile components included in said stranded wires themselves and then provided with said second insulating material, whereby when said heating coil is heated at the time of adhesion between said second insulating materials, the volatile components generated from the inside of said coil portion are prevented from accumulating between said stranded wire and said second insulating material and from deforming said heating coil.

* * * * *